United States Patent
Tani et al.

(10) Patent No.: US 10,452,939 B2
(45) Date of Patent: Oct. 22, 2019

(54) MONITORING SYSTEM, MONITORING DEVICE, AND MONITORING METHOD

(71) Applicant: OMRON Corporation, Kyoto (JP)

(72) Inventors: Yoshiharu Tani, Kusatsu (JP); Toshiyuki Higuchi, Kusatsu (JP); Ikuo Matsukawa, Tokyo (JP); Kazuhiro Kudo, Kusatsu (JP); Tetsuya Akagi, Kyoto (JP); Satoru Shimokawa, Otsu (JP); Kazushige Matsuoka, Otsu (JP)

(73) Assignee: OMRON Corporation, Kyoto (JP)

( * ) Notice: Subject to any disclaimer, the term of this patent is extended or adjusted under 35 U.S.C. 154(b) by 17 days.

(21) Appl. No.: 15/818,756

(22) Filed: Nov. 21, 2017

(65) Prior Publication Data

US 2018/0232593 A1    Aug. 16, 2018

(30) Foreign Application Priority Data

Feb. 15, 2017  (JP) .................................. 2017-025602

(51) Int. Cl.
*G06K 9/20* (2006.01)
*G06K 9/32* (2006.01)
(Continued)

(52) U.S. Cl.
CPC .......... *G06K 9/2054* (2013.01); *B25J 9/1676* (2013.01); *B25J 19/06* (2013.01); *F16P 3/142* (2013.01);
(Continued)

(58) Field of Classification Search
CPC ............. G06K 9/2054; G06K 9/00342; G06K 9/00771; G06K 9/3233; G06T 7/74;
(Continued)

(56) References Cited

U.S. PATENT DOCUMENTS

| 10,029,369 B1* | 7/2018 | Carlisle | .................. B25J 9/1676 |
| 2010/0191372 A1* | 7/2010 | Nihei | ..................... B25J 9/1676 700/245 |

(Continued)

FOREIGN PATENT DOCUMENTS

| JP | 2006-501487 | 1/2006 |
| WO | 2014008929 | 1/2014 |

OTHER PUBLICATIONS

Machida, Eiji, et al. "Human motion tracking of mobile robot with Kinect 3D sensor." 2012 Proceedings of SICE Annual Conference (SICE). IEEE, 2012. (Year: 2012).*

(Continued)

*Primary Examiner* — Jonathan S Lee
(74) *Attorney, Agent, or Firm* — JCIPRNET

(57) ABSTRACT

A monitoring system, a monitoring device, and a monitoring method are provided. The monitoring system includes a detection part that detects a position of a worker intruded into a work area, a first specifying part that specifies a worker movable area on the basis of a position of the worker, an image capturing part that captures an image of an area including at least the worker movable area and a predetermined robot occupied area, a second specifying part that specifies a robot movable area from the image of the area, a third specifying part that specifies a human body area of the worker from the image of the area, a measuring part that measures the distance between the robot movable area and the human body area, and a restricting part that restricts movement of the robot when the distance is equal to or less than a predetermined distance.

7 Claims, 16 Drawing Sheets

(51) Int. Cl.
    G06K 9/00      (2006.01)
    B25J 19/06     (2006.01)
    G06T 7/73      (2017.01)
    B25J 9/16      (2006.01)
    F16P 3/14      (2006.01)
(52) U.S. Cl.
    CPC ..... *G06K 9/00342* (2013.01); *G06K 9/00771* (2013.01); *G06K 9/3233* (2013.01); *G06T 7/74* (2017.01); *G05B 2219/39082* (2013.01); *G05B 2219/39091* (2013.01); *G05B 2219/40201* (2013.01); *G05B 2219/40202* (2013.01); *G05B 2219/40492* (2013.01); *G06T 2207/30196* (2013.01); *G06T 2207/30204* (2013.01); *Y10S 901/47* (2013.01); *Y10S 901/49* (2013.01)
(58) Field of Classification Search
    CPC ........... G06T 2207/30204; B25J 9/1676; B25J 19/06; F16P 3/142; G06B 2219/39082; G06B 2219/39091; G06B 2219/40201; G06B 2219/40202; G06B 2219/40492; G06B 2219/30196; Y10S 901/47; Y10S 901/49
    USPC ........................................................ 382/103
    See application file for complete search history.

(56)            References Cited

U.S. PATENT DOCUMENTS

| 2014/0067121 | A1* | 3/2014  | Brooks   | B25J 9/1676 700/255 |
| 2015/0217455 | A1  | 8/2015  | Kikkeri et al. | |
| 2016/0199140 | A1* | 7/2016  | Gombert  | A61B 1/00188 606/130 |
| 2018/0033276 | A1* | 2/2018  | Whelan   | G06K 9/00348 |
| 2018/0222052 | A1* | 8/2018  | Vu       | G01S 17/026 |
| 2018/0354135 | A1* | 12/2018 | Carlisle | B25J 9/1676 |
| 2019/0151028 | A1* | 5/2019  | Bodduluri | A61B 34/30 |

OTHER PUBLICATIONS

"Search Report of Europe Counterpart Application", dated Jun. 4, 2018, p. 1-p. 7.

* cited by examiner

MONITORING SYSTEM, MONITORING DEVICE, AND MONITORING METHOD

CROSS-REFERENCE TO RELATED APPLICATION

This application claims the priority benefit of Japanese Patent Application no. 2017-025602, filed on Feb. 15, 2017. The entirety of the above-mentioned patent application is hereby incorporated by reference herein and made a part of this specification.

BACKGROUND OF THE INVENTION

Field of the Invention

The disclosure relates to a monitoring system, a monitoring device, and a monitoring method for monitoring the movement of workers and robots such that the workers can work safely within a work area where workers and robots work.

Description of Related Art

A monitoring system that monitors the movement of workers and robots within a work area where workers and robots work in collaboration has been proposed in the related art. For example, in a technology described in Patent Document 1, a plurality of image capturing devices capture images of the entire work area and image processing is performed on the captured images to detect the positions of workers and the positions of robots. The technology described in Patent Document 1 controls the movement of robots such that workers can work safely on the basis of the detected positions of the workers and the detected positions of the robots.

In the above Patent Document 1, there is a need to perform image processing on images of the entire work area, and therefore there is a problem that the burden of image processing increases.

RELATED ART DOCUMENT

Patent Documents

[Patent Document 1] Published Japanese Translation No. 2006-501487 of the PCT International Publication

SUMMARY OF THE INVENTION

In one or some of exemplary embodiments of the invention, a monitoring system, a monitoring device, and a monitoring method that reduce the burden of image processing are provided.

In one or some of exemplary embodiments of the invention, a monitoring system having a monitoring device configured to monitor movement of a worker and a robot to allow the worker to work safely in a work area in which the worker and the robot work includes a detection part configured to detect a position of the worker that has intruded into the work area, a first specifying part configured to specify a worker movable area indicating a range in which the worker is movable on the basis of the position of the worker detected by the detection part, an image capturing part configured to capture an image of an area including at least the worker movable area specified by the first specifying part and a predetermined robot occupied area of the robot, a second specifying part configured to specify a robot movable area indicating a range in which a movable portion of the robot is movable according to the image of the area captured by the image capturing part, a third specifying part configured to specify a human body area of the worker according to the image of the area captured by the image capturing part, a measuring part configured to measure a distance between the robot movable area specified by the second specifying part and the human body area specified by the third specifying part, and a restricting part configured to restrict movement of the robot when the distance measured by the measuring part is equal to or less than a predetermined distance.

In one or some of exemplary embodiments of the invention, a monitoring device configured to monitor movement of a worker and a robot to allow the worker to work safely in a work area in which the worker and the robot work includes a first specifying part configured to specify a worker movable area indicating a range in which the worker is movable on the basis of a position of the worker detected by a detection part configured to detect the position of the worker that has intruded into the work area, a second specifying part configured to specify a robot movable area indicating a range in which a movable portion of the robot is movable according to an image of an area captured by an image capturing part configured to capture the image of the area including at least the worker movable area specified by the first specifying part and a predetermined robot occupied area of the robot, a third specifying part configured to specify a human body area of the worker according to the image of the area captured by the image capturing part, a measuring part configured to measure a distance between the robot movable area specified by the second specifying part and the human body area specified by the third specifying part, and a restricting part configured to restrict movement of the robot when the distance measured by the measuring part is equal to or less than a predetermined value.

In one or some of exemplary embodiments of the invention, a monitoring method for monitoring movement of a worker and a robot to allow the worker to work safely in a work area in which the worker and the robot work includes specifying a worker movable area indicating a range in which the worker is movable on the basis of a position of the worker detected by a detection part configured to detect the position of the worker that has intruded into the work area, specifying a robot movable area indicating a range in which a movable portion of the robot is movable according to an image of an area captured by an image capturing part configured to capture the image of the area including at least the specified worker movable area and a predetermined robot occupied area of the robot, specifying a human body area of the worker according to the image of the area captured by the image capturing part, measuring a distance between the robot movable area and the human body area, and restricting movement of the robot when the measured distance is equal to or less than a predetermined value.

DESCRIPTION OF THE EMBODIMENTS

Figure 1:
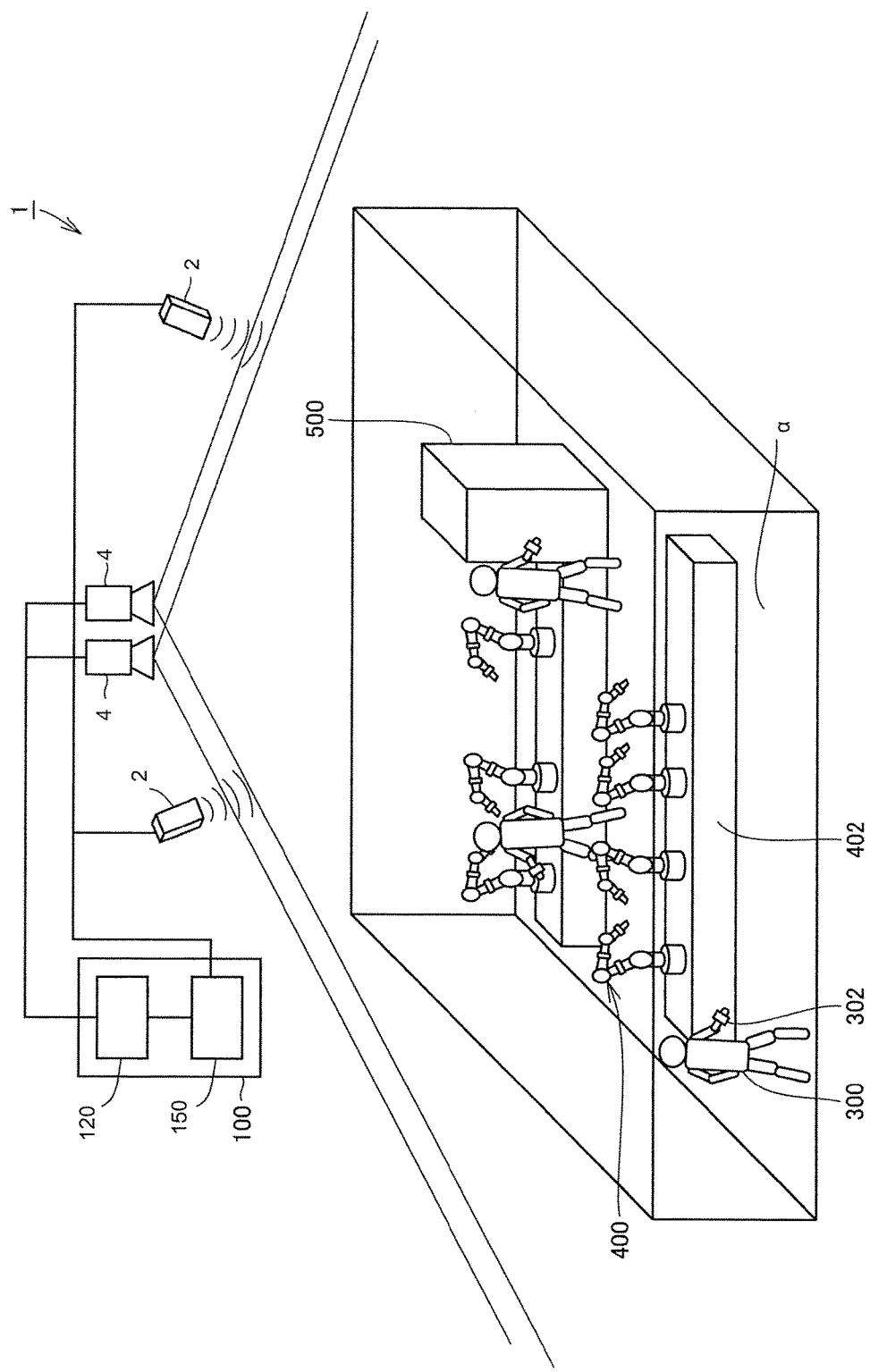
FIG. 1 is a diagram showing an exemplary configuration of a monitoring system 1 according to an embodiment.

In one or some of exemplary embodiments of the invention, a monitoring system, a monitoring device, and a monitoring method that reduce the burden of image processing are provided.

In one or some of exemplary embodiments of the invention, a monitoring system having a monitoring device configured to monitor movement of a worker and a robot to allow the worker to work safely in a work area in which the worker and the robot work includes a detection part configured to detect a position of the worker that has intruded into the work area, a first specifying part configured to specify a worker movable area indicating a range in which the worker is movable on the basis of the position of the worker detected by the detection part, an image capturing part configured to capture an image of an area including at least the worker movable area specified by the first specifying part and a predetermined robot occupied area of the robot, a second specifying part configured to specify a robot movable area indicating a range in which a movable portion of the robot is movable according to the image of the area captured by the image capturing part, a third specifying part configured to specify a human body area of the worker according to the image of the area captured by the image capturing part, a measuring part configured to measure a distance between the robot movable area specified by the second specifying part and the human body area specified by the third specifying part, and a restricting part configured to restrict movement of the robot when the distance measured by the measuring part is equal to or less than a predetermined distance.

In one or some of exemplary embodiments of the invention, the first specifying part is configured to specify a new worker movable area by excluding an area in which the worker cannot be present from the worker movable area specified on the basis of the position of the worker detected by the detection part.

In one or some of exemplary embodiments of the invention, the monitoring system further includes a setting part configured to set an area that is a combination of the worker movable area and the robot occupied area that at least partially overlaps the worker movable area as a combined area, wherein the second specifying part is configured to specify the robot movable area according to an image of the combined area in the area captured by the image capturing part, and the third specifying part is configured to specify the human body area according to the image of the combined area in the area captured by the image capturing part.

In one or some of exemplary embodiments of the invention, the image capturing part is configured to capture an image of only a combined area that is a combination of the worker movable area and the robot occupied area that at least partially overlaps the worker movable area.

In one or some of exemplary embodiments of the invention, the second specifying part is configured to specify the robot movable area on the basis of the marker provided on the movable portion of the robot.

In one or some of exemplary embodiments of the invention, the monitoring system further includes a fourth specifying part configured to specify a position of the movable portion of the robot according to an image captured by the image capturing part on the basis of a marker provided on the movable portion of the robot, and a comparing part configured to compare the position of the movable portion of the robot specified by the fourth specifying part with a movement indicated by movement information input to a controller of the robot.

In one or some of exemplary embodiments of the invention, the robot is shiftable, the detection part is configured to specify a position of the robot, and the first specifying part is configured to specify the robot occupied area on the basis of the position of the robot detected by the detection part.

In one or some of exemplary embodiments of the invention, a monitoring device configured to monitor movement of a worker and a robot to allow the worker to work safely in a work area in which the worker and the robot work includes a first specifying part configured to specify a worker movable area indicating a range in which the worker is movable on the basis of a position of the worker detected by a detection part configured to detect the position of the worker that has intruded into the work area, a second specifying part configured to specify a robot movable area indicating a range in which a movable portion of the robot is movable according to an image of an area captured by an image capturing part configured to capture the image of the area including at least the worker movable area specified by the first specifying part and a predetermined robot occupied area of the robot, a third specifying part configured to specify a human body area of the worker according to the image of the area captured by the image capturing part, a measuring part configured to measure a distance between the robot movable area specified by the second specifying part and the human body area specified by the third specifying part, and a restricting part configured to restrict movement of the robot when the distance measured by the measuring part is equal to or less than a predetermined value.

In one or some of exemplary embodiments of the invention, a monitoring method for monitoring movement of a worker and a robot to allow the worker to work safely in a work area in which the worker and the robot work includes specifying a worker movable area indicating a range in which the worker is movable on the basis of a position of the worker detected by a detection part configured to detect the position of the worker that has intruded into the work area, specifying a robot movable area indicating a range in which a movable portion of the robot is movable according to an image of an area captured by an image capturing part configured to capture the image of the area including at least the specified worker movable area and a predetermined robot occupied area of the robot, specifying a human body area of the worker according to the image of the area captured by the image capturing part, measuring a distance between the robot movable area and the human body area, and restricting movement of the robot when the measured distance is equal to or less than a predetermined value.

According to the monitoring system, the monitoring device, and the monitoring method according to the present technology, it is possible to reduce the burden of image processing.

Embodiments of the invention will be described in detail with reference to the drawings. In the drawings, the same or corresponding parts are denoted by the same reference numerals and descriptions thereof will not be repeated.

<Exemplary Configuration of Monitoring System 1>

First, an exemplary configuration of a monitoring system 1 including a monitoring device according to the present embodiment will be described.

FIG. 1 is a diagram showing an exemplary configuration of the monitoring system 1 according to the present embodiment. As shown in FIG. 1, the monitoring system 1 according to the present embodiment has a monitoring device 100, one or more cameras 4 serving as one or more image capturing parts, and one or more sensors 2 serving as one or more detection parts. The monitoring device 100 includes a vision controller 120 and a safety controller 150. In the present embodiment, the vision controller 120, the safety controller 150, and a robot controller which will be described later are provided independent of each other. In other words, the vision controller 120, the safety controller 150, and the robot controller are configured in separate housings. In the example of FIG. 1, two cameras 4 are installed and two sensors 2 are installed.

The monitoring system 1 monitors the movements of workers 300 and robots 400 such that the workers 300 can work safely within a work area α in which the workers 300 and the robots 400 work. In the present embodiment, the robots 400 operate (i.e. work) in a state in which they are fixed at their locations without shifting. The sensors 2 detect the positions of the workers 300 who have intruded into the work area α. In the present embodiment, radio frequency (RF) tags that output radio waves are used as a method of detecting the positions of the workers 300. The sensors 2 can detect the RF tags. The workers 300 attach RF tags 302 to parts of their bodies, whereby the sensors 2 specify the positions of the RF tags 302 (i.e., the positions of the workers 300). The positions of the workers 300 are, for example, three-dimensional coordinates in the work area α. The "sensors 2 specify the positions of the workers 300" means, for example, that "the sensors 2 acquire three-dimensional coordinates of the RF tags 302 attached to the workers 300 in the work area α."

Tags that output ultrasonic waves may be used instead of the RF tags. In this case, the sensors 2 detect the positions of the RF tags 302 by receiving ultrasonic waves. What the tags output and the sensor 2 receive are not limited to radio waves and ultrasonic waves and may be something other than radio waves and ultrasonic waves.

A plurality of robots 400 are installed in the work area α. In the example of FIG. 1, the robots 400 are placed on a mounting table 402. Within the work area α, the workers 300 can work in collaboration with the robots 400.

A structure 500 is installed in the work area α. The structure 500 may be one which the workers 300 cannot enter. The structure 500 may be, for example, a control device including a robot controller that controls the robots 400. The structure 500 may be a shelf on which loads of the workers 300 or the like can be placed.

The cameras 4 mainly capture moving images of the workers 300, the robots 400, or the like in the work area α. Each of the cameras 4 includes an optical system such as a lens and an image capturing element. The image capturing element is a coupled charged device (CCD), a complementary metal oxide semiconductor (CMOS) sensor, or the like. In the present embodiment, two cameras 4 are provided. Through the two cameras 4, it is possible to three-dimensionally capture images in the work area α.

<Exemplary Hardware Configuration of Monitoring Device 100>

Figure 2:
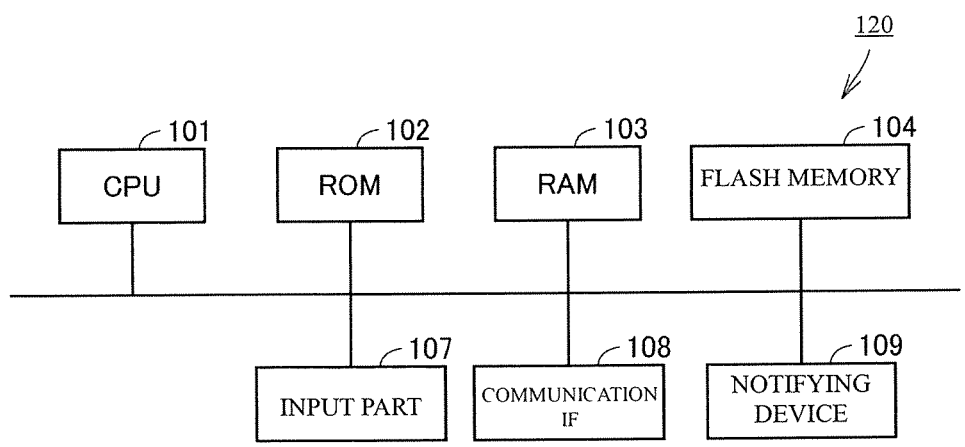
FIG. 2 is a diagram showing a hardware configuration of a controller.

FIG. 2 shows an example of the exemplary hardware configuration of the vision controller 120. As shown in FIG. 2, the vision controller 120 includes a central processing unit (CPU) 101 that executes programs, a read only memory (ROM) 102 that stores data in a nonvolatile manner, a random access memory (RAM) 103 that stores data in a volatile manner, a flash memory 104, an input part 107, a communication interface (IF) 108 that transmits and receives information and signals, and a notifying device 109 that performs error notification or the like. A program executed by the CPU 101 or the like is stored in the ROM 102. The safety controller 150 and the robot controller respectively adopt the same hardware configuration as that of FIG. 2.

<Exemplary Functional Configuration of Monitoring Device 100>

Figure 3:
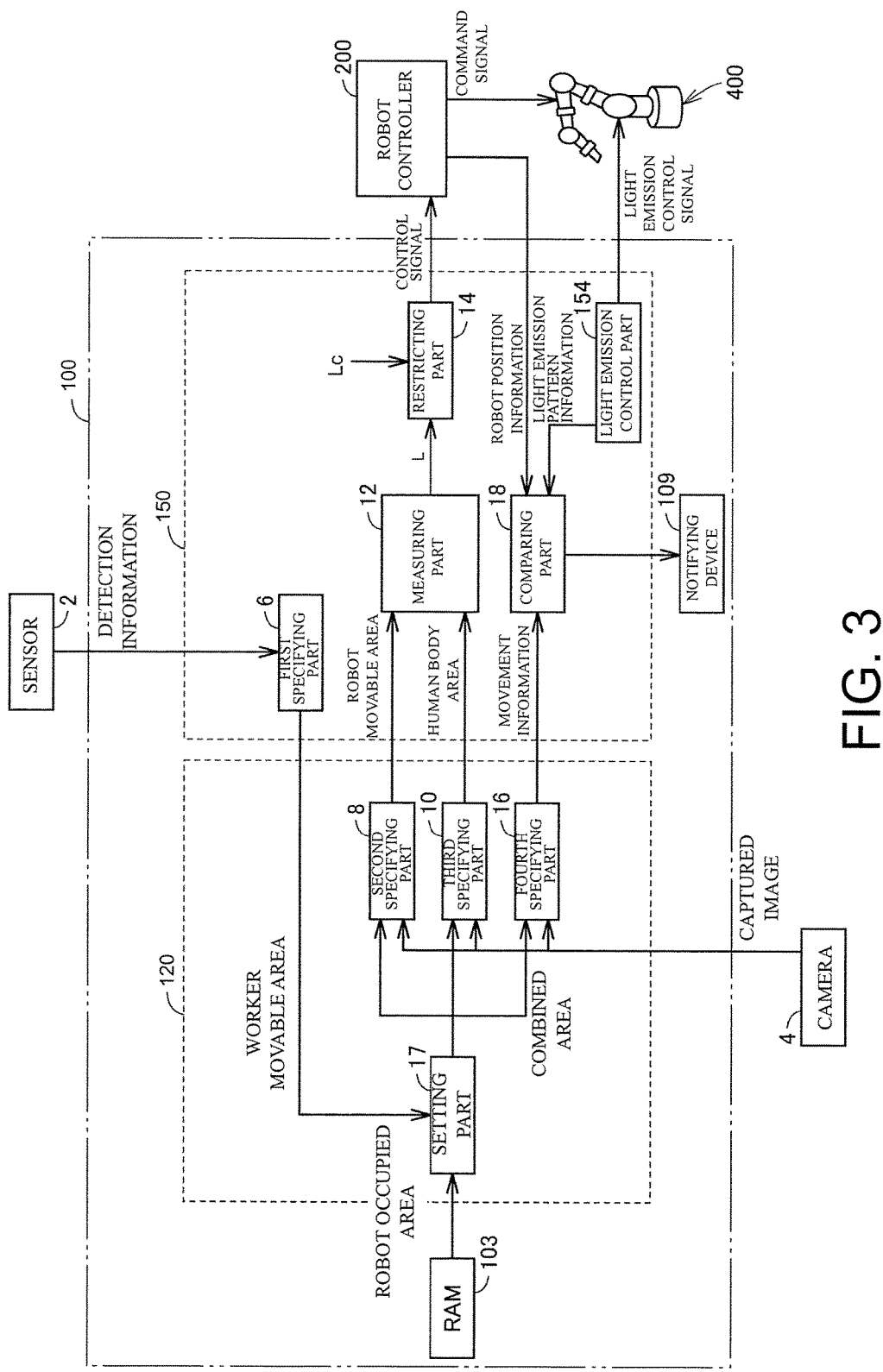
FIG. 3 is a diagram showing an exemplary functional configuration of a monitoring device.

Next, an exemplary functional configuration of the monitoring device 100 is shown. FIG. 3 is a diagram showing the exemplary functional configuration of the monitoring device 100. The vision controller 120 includes a second specifying part 8, a third specifying part 10, a fourth specifying part 16, and a setting part 17. The safety controller 150 includes a first specifying part 6, a measuring part 12, a restricting part 14, a comparing part 18, and a light emission control part 154.

The sensors 2 detect the position of a worker 300 who has intruded into the work area α on the basis of an RF tag 302 attached to the worker 300. Detection information indicating the position of the worker 300 detected by the sensors 2 is input to the first specifying part 6. The first specifying part 6 specifies a worker movable area 300A on the basis of the detection information indicating the RF tag 302 (the position of a worker 300) detected by the sensors 2.

Figure 4:
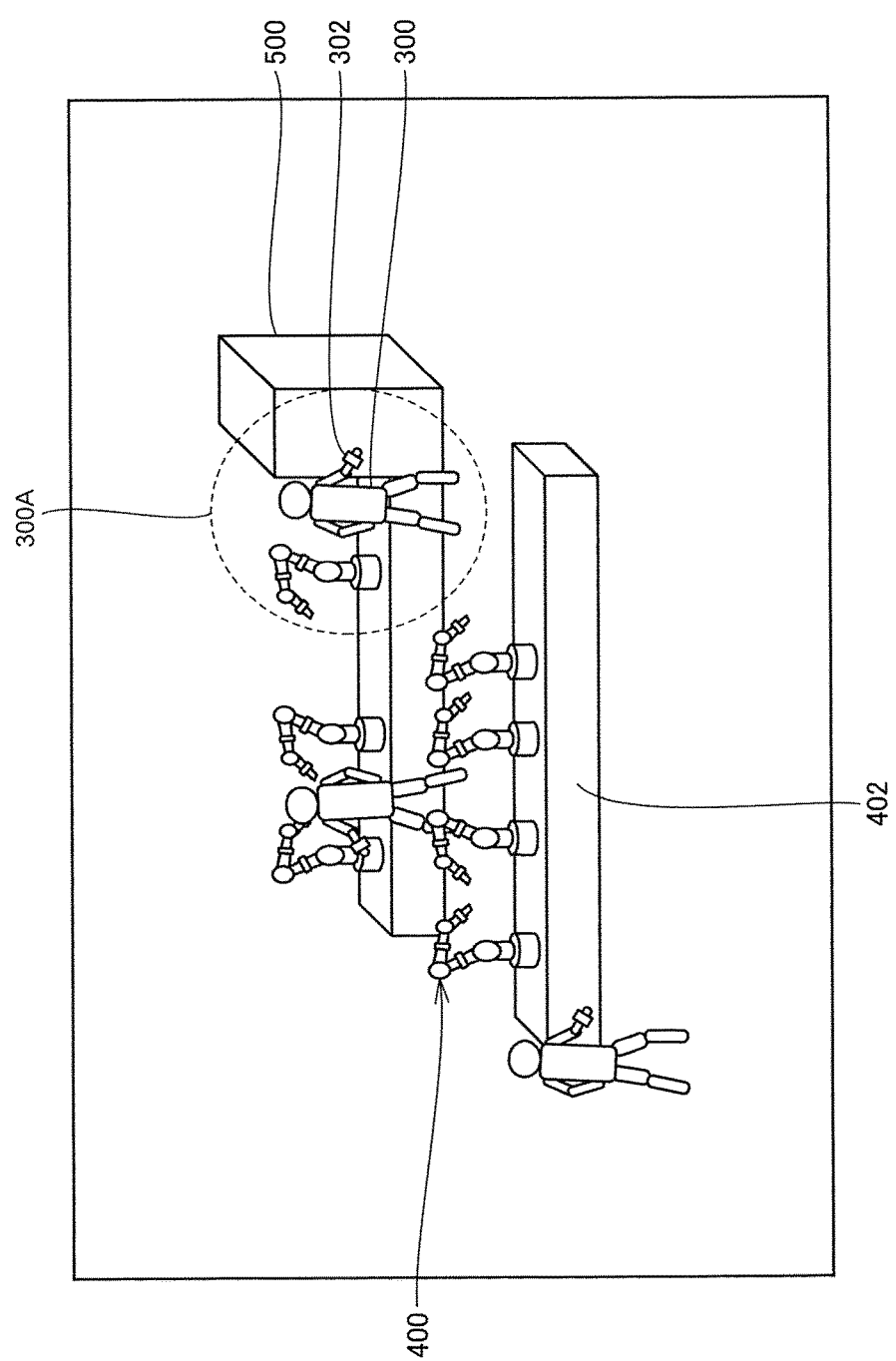
FIG. 4 is a diagram showing a worker movable area.

FIG. 4 is a diagram showing the worker movable area 300A. The worker movable area 300A indicates a range in which the worker 300 is movable. In general, the movement speed of a worker within the work area α is presumed. The worker movable area 300A is an area that is estimated to be that through which the worker 300 or a part thereof (for example, an arm of the worker 300) passes as the worker 300 or the part thereof moves within a predetermined time (for example, 1 second).

The worker movable area 300A is an area including the position of the RF tag 302 detected by the sensors 2. Therefore, even when a detection error of the sensors 2 has occurred, the worker movable area 300A can absorb the detection error. Thus, the worker movable area 300A of the present embodiment is an area that also takes into consideration detection errors of the sensors 2. The worker movable area 300A can also be said to be an area in which there is a possibility that there is an intruder (that is, a worker 300). A region of interest (ROI) in the images captured by the cameras 4 is an area of interest to be monitored in the image captured by the cameras 4 and corresponds to the worker movable area 300A specified by the first specifying part 6.

The worker movable area 300A specified by the first specifying part 6 is input to the setting part 17. In this specification, a term "area" such as in "worker movable area 300A" is also used to refer to information indicating the area. Therefore, for example, the "worker movable area 300A is input to the setting part 17" means that "information indicating the worker movable area 300A is input to the setting part 17." A robot occupied area 400A stored in the RAM 103 is also input to the setting part 17.

Figure 5:
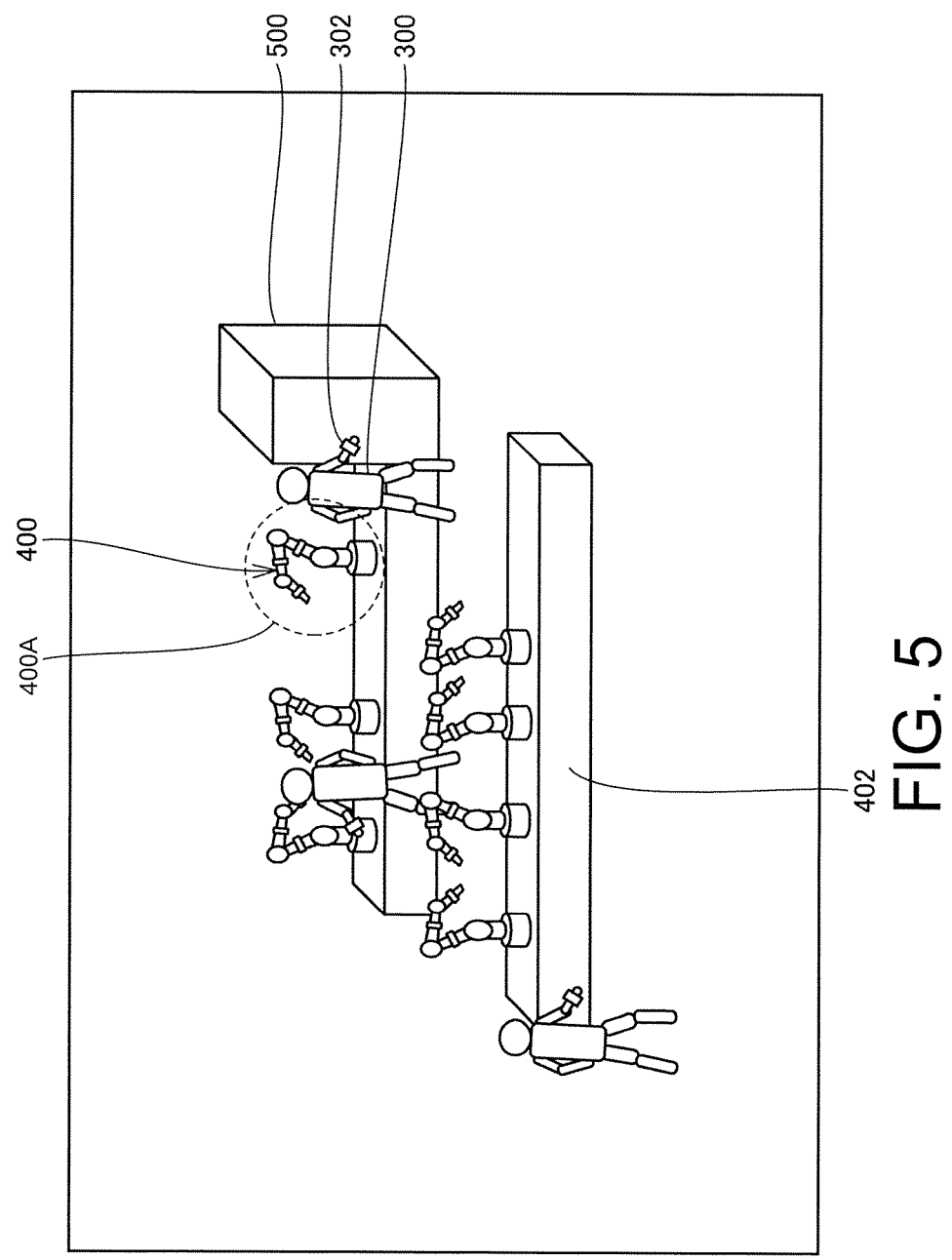
FIG. 5 is a diagram showing a robot occupied area.

Here, the robot occupied area 400A will be described. FIG. 5 is a diagram showing the robot occupied area 400A. The robot occupied area 400A is an area through which a part of a robot 400 (for example, arms 406 shown in FIG. 8) and the entirety of the robot 400 may pass during all work that the robot 400 may execute. The robot occupied area 400A is also information stored in a predetermined storage area (in the RAM 103 in the present embodiment). The robot occupied area 400A is a predetermined area since the position of each robot is predetermined. The robot occupied area 400A is an area specified by a range of three-dimensional coordinates (an x coordinate, a y coordinate, and a z coordinate).

A manager of the monitoring device 100, for example, a supervisor of the work area α or the like, inputs the position of each robot 400 to the input part 107. A conversion part (not specifically shown) included in the monitoring device 100 converts the input position of each robot 400 into a robot occupied area. The converted robot occupied area is stored in the RAM 103 for each robot.

Generally, the position of each robot is changed depending on which work is performed in the work area α. The robot occupied area 400A is generated from the position of each robot 400 input by the manager of the monitoring device 100. Thus, even if the position of the robot is changed, the monitoring device 100 can generate the robot occupied area 400A flexibly according to the change.

Figure 6:
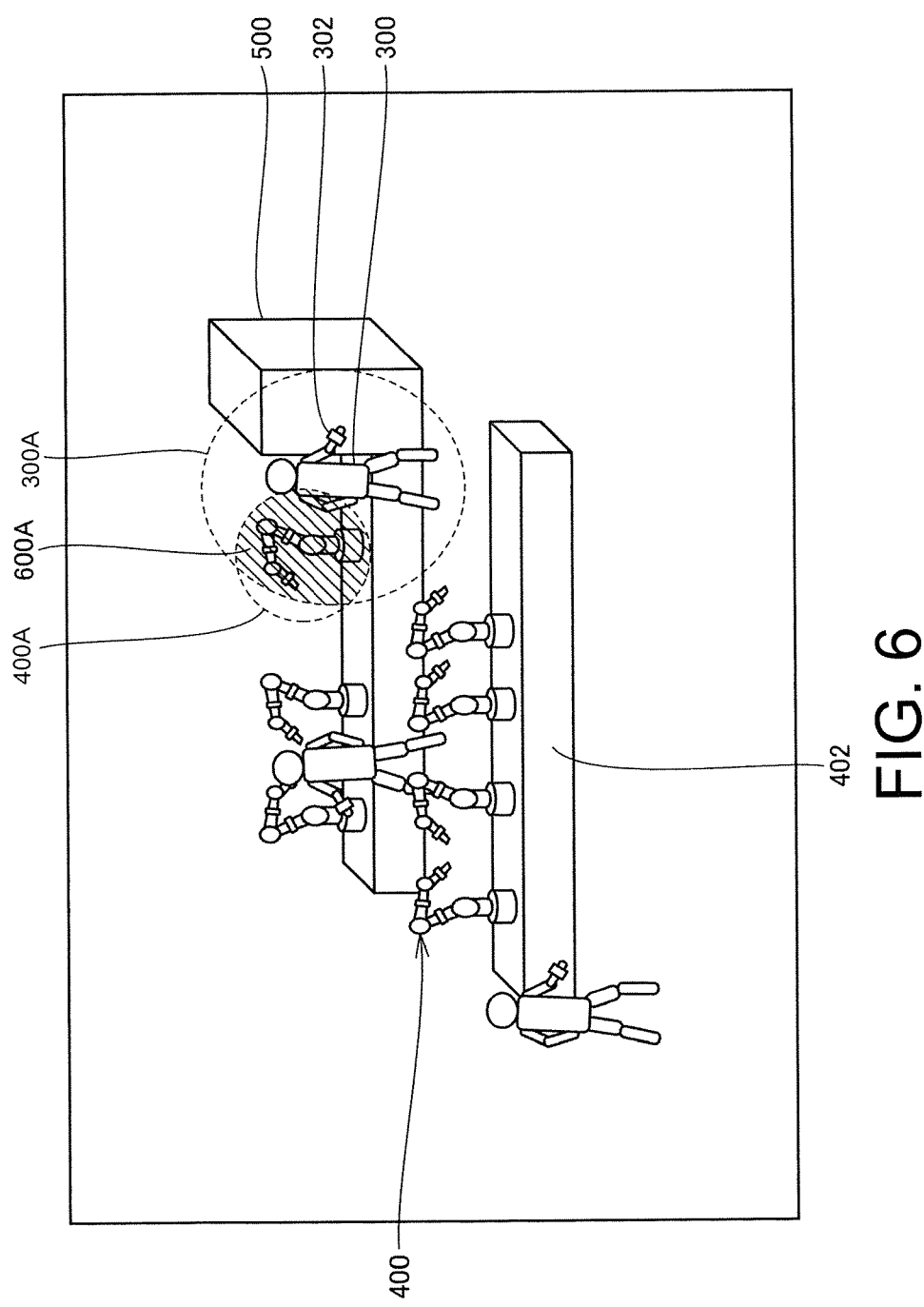
FIG. 6 is a diagram showing a region where a worker movable area and a robot occupied area overlap.

The setting part 17 sets an area that is a combination of the worker movable area 300A provided from the first specifying part 6 and the robot occupied area 400A that at least partially overlaps the worker movable area 300A as a combined area. FIG. 6 is a diagram showing a worker movable area 300A and a robot occupied area 400A which at least partially overlaps the worker movable area 300A. In the example of FIG. 6, the worker movable area 300A and a part of the robot occupied area 400A overlap each other in an area 600A (the hatched portion). When one of the worker movable area 300A and the robot occupied area 400A is included in the other, the greater of the worker movable area 300A and the robot occupied area 400A may be set as a combined area.

Figure 7:
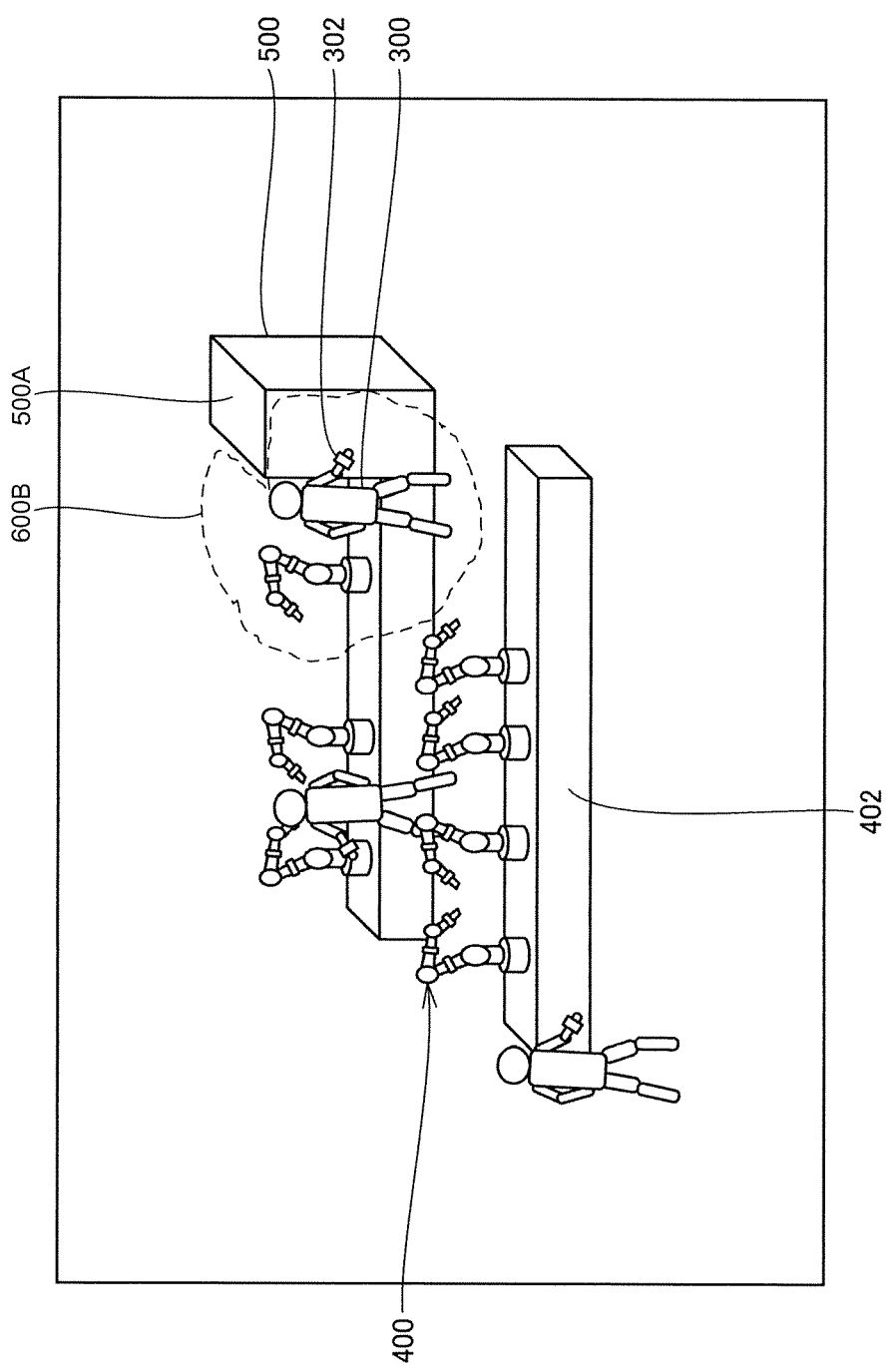
FIG. 7 is a diagram showing a combined area 600B.

FIG. 7 is a diagram showing a combined area 600B set by the setting part 17. In the example of FIG. 7, the setting part 17 sets an area obtained by excluding an exclusion area 500A from an area corresponding to the logical sum (i.e., the OR) of the worker movable area 300A and the robot occupied area 400A as the combined area 600B. This exclusion area 500A is the area of the structure 500. The worker 300 cannot enter the structure 500. Thus, the exclusion area 500A can be said to be an area where the worker 300 cannot be present. The set combined area 600B is input to the second specifying part 8, the third specifying part 10, and the fourth specifying part 16. In the present embodiment, the setting part 17 excludes the exclusion area 500A from the worker movable area 300A and sets an area corresponding to the logical sum of the worker movable area 300A, excluding the exclusion area 500A, and the robot occupied area 400A as the combined area 600B.

The position of the structure 500 is also predetermined. Thus, the exclusion area 500A of the structure 500 is learned in advance and stored in advance in a predetermined storage area (for example, in the RAM 103). The setting part 17 excludes the exclusion area 500A from the worker movable area 300A using information (coordinates) of the stored exclusion area 500A. Here, any method may be used for the learning or the like. Such a method is described, for example, in the specification of "United States Patent Application Publication No. 2011-242283."

Figure 8:
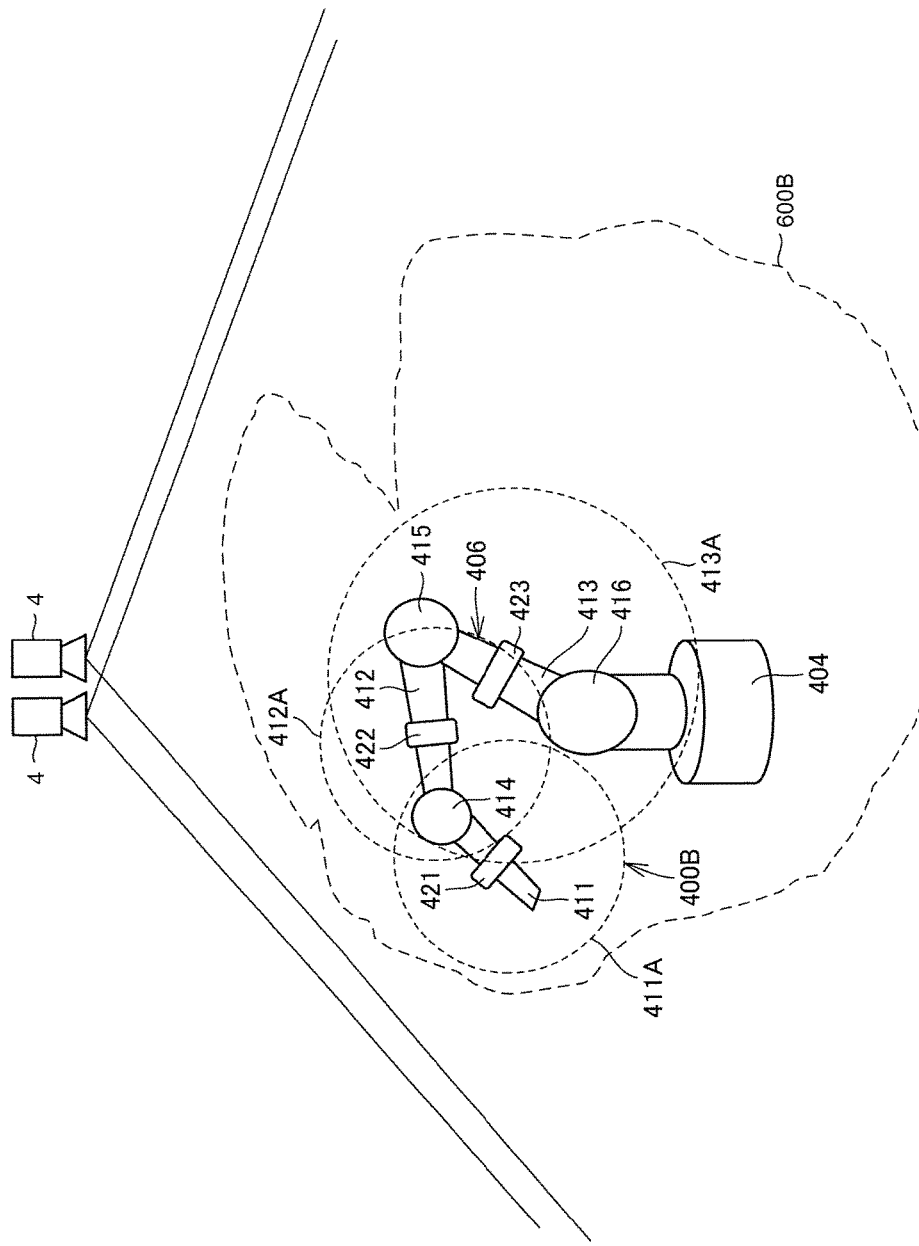
FIG. 8 is a diagram showing a robot movable area.

The second specifying part 8 specifies a robot movable area indicating a range, in which a movable portion of a robot 400 (an a in thereof in the present embodiment) is movable, according to the image of an area captured by the cameras 4. The robot 400 is that which is included in the combined area 600B in the image of the area captured by the cameras 4. FIG. 8 is a diagram showing the robot movable area.

First, a detailed structure of the robot 400 will be described with reference to FIG. 8. The robot 400 includes a base portion 404 and arms 406. The arms 406 include a first arm 411, a second arm 412, a third arm 413, a joint portion 414 connecting the first arm 411 and the second arm 412, a joint portion 415 connecting the second arm 412 and the third arm 413, and a joint portion 416 connecting the third arm 413 and the base portion 404. This configuration allows the arms 406 to move in three dimensions.

The second specifying part 8 specifies a robot movable area on the basis of markers provided on the arms 406 which are movable portions of the robot 400. The markers of this embodiment are LEDs that emit light. In the present embodiment, a first LED 421 is provided at a center portion in the extending direction of the first arm 411. A second LED 422 is provided at a center portion in the extending direction of the second arm 412. A third LED 423 is provided at a center portion in the extending direction of the third arm 413. Each of the LEDs emits light under the control of the light emission control part 154 in the safety controller 150.

Each LED may be attached to each arm in a wound form such that the LED does not enter positions where the LED cannot be captured by the cameras 4 as the LED moves into the shadow of the robot 400 due to movement of the robot 400.

The first LED 421, the second LED 422, and the third LED 423 emit light in respective light emission modes associated therewith. Table 1 is a diagram showing the associated light emission modes. In the example of Table 1, the first LED 421 continuously emits light (i.e. continues to emit light), the second LED 422 emits light every one second (i.e. blinks every one second), and the third LED 423 emits light every two seconds (i.e. blinks every two seconds). The light emission modes of the first LED 421, the second LED 422, and the third LED 423 (hereinafter referred to as "LED light emission modes") are stored in a predetermined storage area (the ROM 102 in the present embodiment).

TABLE 1

| LED | LIGHT EMISSION MODES. |
|---|---|
| FIRST LED 421. | CONTINUOUSLY EMIT. |
| SECOND LED 422. | BLINK EVERY ONE SECOND. |
| THIRD LED 423. | BLINK EVERY TWO SECONDS. |

The image captured by the cameras 4 is input to the second specifying part 8. The second specifying part 8 extracts an image included in the combined area 600B from the captured image. Thereafter, the second specifying part 8 can recognize movements of the first arm 411, the second arm 412, and the third arm 413 in the extracted image on the basis of the LED light emission modes stored in the ROM 102. That is, the second specifying part 8 can recognize a movement of the first arm 411 by recognizing an LED which continuously emits light as the first LED 421 and then recognizing the trajectory of the first LED 421. The second specifying part 8 can recognize a movement of the second arm 412 by recognizing an LED which blinks every one second as the second LED 422 and then recognizing the trajectory of the second LED 422. The second specifying part 8 can recognize a movement of the third arm 413 by recognizing an LED which blinks every two seconds as the third LED 423 and then recognizing the trajectory of the third LED 423.

By recognizing the movement of the first arm 411, the second specifying part 8 can recognize a first arm area 411A in which the first arm 411 is movable (i.e., an area presumed to be that in which the first arm 411 is present). By recognizing the movement of the second arm 412, the second specifying part 8 can recognize a second arm area 412A in which the second arm 412 is movable (i.e., an area presumed to be that in which the second arm 412 is present). By recognizing the movement of the third arm 413, the second specifying part 8 can recognize a third arm area 413A in which the third arm 413 is movable (i.e., an area presumed to be that in which the third arm 413 is present).

Further, the second specifying part 8 specifies a robot movable area 400B by combining the first arm area 411A, the second arm area 412A, and the third arm area 413A. In the present embodiment, the second specifying part 8 specifies an area corresponding to the logical sum (OR) of the first arm area 411A, the second arm area 412A, and the third arm area 413A as the robot movable area 400B. The robot movable area 400B is a region indicating a range in which the arms 406 are movable on the basis of the movement of the movable portions (i.e., the arms 406) of the robot 400. In other words, the robot movable area 400B is an area estimated to be that through which the arms 406 of the robot 400 pass as they move. The robot movable area 400B is also an area including the positions of the LEDs recognized by the second specifying part 8. Therefore, even when a recognition error of the second specifying part 8 has occurred, the robot movable area 400B can absorb the recognition error. The robot occupied area 400A is an area through which a part of the robot 400 (for example, the arms 406 shown in FIG. 8) and the entirety of the robot 400 may pass during all work that the robot 400 may execute. On the other hand, the robot movable area 400B is an area through which it is predicted that the arms 406 will pass on the basis of the current movements of the arms 406. Therefore, the robot movable area 400B is narrower than the robot occupied area 400A.

The second specifying part 8 can specify the robot movable area 400B indicating a range in which the movable portions of the robot 400 move by recognizing movements of the LEDs (i.e., the first LED 421, the second LED 422, and the third LED 423) included in the combined area 600B in the captured image. The specified robot movable area 400B is input to the measuring part 12. The robot movable area 400B is an area specified by a range of three-dimensional coordinates (an x coordinate, a y coordinate, and a z coordinate).

Figure 9:
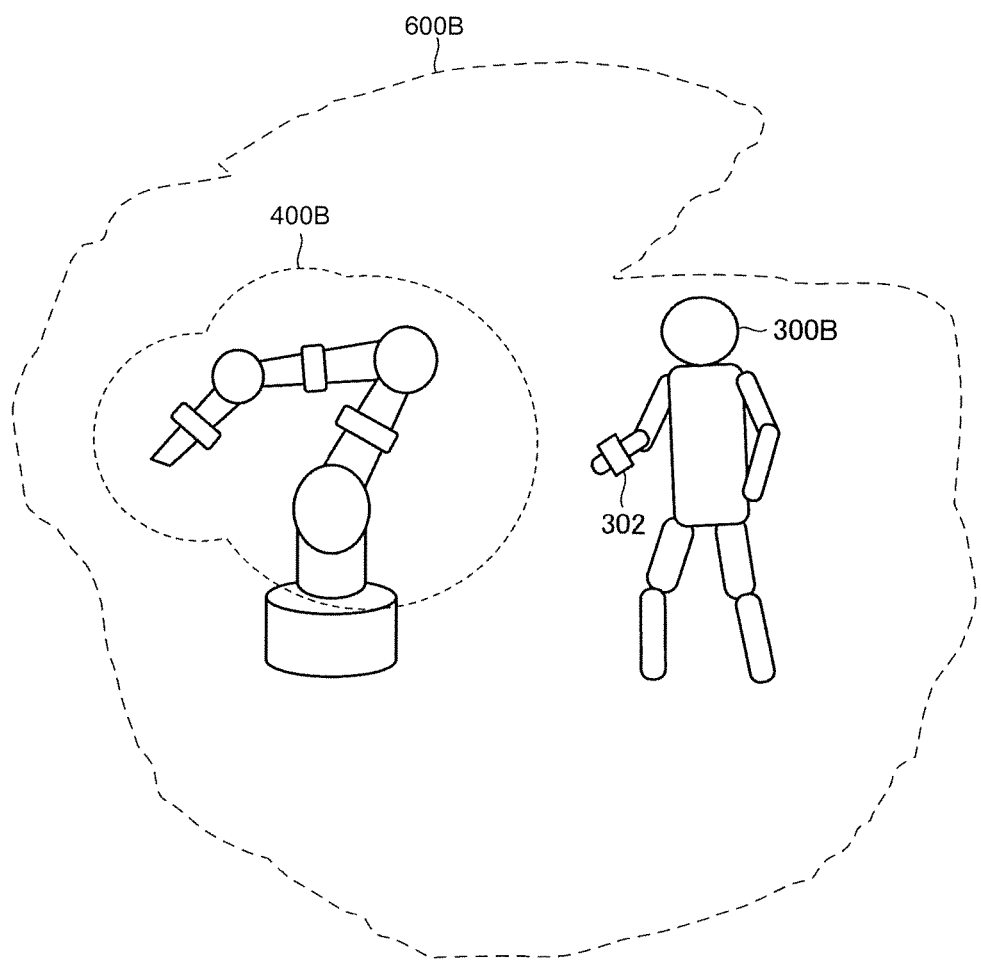
FIG. 9 is a diagram showing a robot movable area and a human body area.

The third specifying part 10 specifies a human body area of the worker 300 according to an image of the combined area 600B in the area of the image captured by the cameras 4. FIG. 9 is a diagram showing a robot movable area 400B and a human body area 300B in an image inside the combined area 600B. For example, the third specifying part 10 extracts feature amounts on a minimum image unit basis (for example, on a pixel basis) of the image of the combined area 600B. Feature amounts of the human body are stored in advance as a model in the ROM 102. Here, the feature amounts are those which indicate the face of the worker 300, work clothes worn by the worker 300, and the like. The third specifying part 10 calculates the degrees of matching between the extracted feature amounts and the feature amounts stored in the ROM 102 according to the differences therebetween. For example, the degree of matching calculated by the third specifying part 10 is small if the difference is great, and great if the difference is small. The third specifying part 10 specifies, as a human body area, a region corresponding to feature amounts whose matching degrees are higher than a predetermined threshold value. It should be noted that the method of specifying the human body area is not limited to this and other methods may be used.

The third specifying part 10 may also extract a feature amount of an area of the RF tag 302 and a feature amount of an area around the RF tag 302 in the combined area 600B without extracting feature amounts of other areas. Compared to the configuration in which feature amounts of all regions of the combined area 600B are extracted, this configuration can narrow the area from which feature amounts are extracted, thereby reducing the burden of processing for extracting feature amounts. The specified human body area 300B is input to the measuring part 12. The human body area 300B is an area specified by a range of three-dimensional coordinates (an x coordinate, a y coordinate, and a z coordinate).

Figure 10:
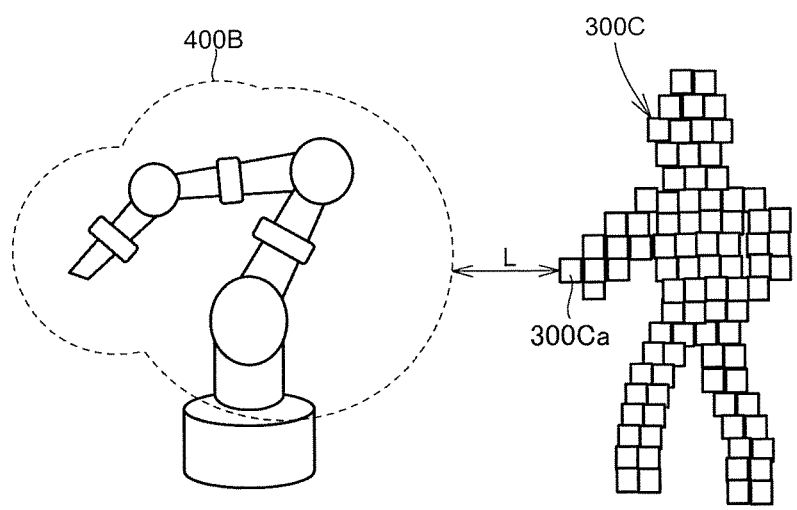
FIG. 10 is a diagram showing an aggregate of cluster information.

The measuring part 12 measures the distance L between the robot movable area 400B specified by the second specifying part 8 and the human body area 300B specified by the third specifying part 10. For this measurement, the measuring part 12 divides the human body area 300B into regions of minimum units to generate an aggregate 300C of cluster information. FIG. 10 is a diagram showing the aggregate 300C of cluster information. The measuring part 12 measures the (three-dimensional) distance L between the robot movable area 400B and a cluster information item 300Ca which is closest to the robot movable area 400B in the aggregate 300C of cluster information. The measured distance L is input to the restricting part 14.

When the input distance L is equal to or less than a predetermined distance Lc (threshold), the restricting part 14 transmits a restricting signal to the robot controller 200 to restrict the movement of the robot 400. The robot controller 200 is a controller that controls the movement of each robot 400. The restricting signal is a signal for restricting the movement of the robot 400.

Here, the robot 400 whose movement is to be restricted (hereinafter also referred to as a "robot to be controlled") is a robot whose distance L to the cluster information item 300Ca is determined to be equal to or less than the distance Lc. Examples of the restriction of the movement of the robot include a process of lowering the movement speed of the robot 400 and a process of completely stopping the movement of the robot 400. The predetermined distance Lc is stored in advance in the ROM 102. The distance Lc is, for example, 1 m.

For example, upon determining that the distance L is equal to or less than the distance Lc and further that the difference ΔL between the distance L and the distance Lc is equal to or less than a first predetermined value Th1, the restricting part 14 transmits a restricting signal, which indicates that the movement speed of the robot 400 is to be lowered, to the robot controller 200. Thus, upon receiving the restricting signal, the robot controller 200 can lower the movement speed of the target robot 400, the movement of which is to be restricted.

Further, upon determining that the distance L is equal to or less than the distance Lc and further that the difference ΔL between the distance L and the distance Lc is equal to or less than a second predetermined value Th2 (Th2<Th1), the restricting part 14 transmits a restricting signal, which indicates that the movement of the robot 400 is to be completely stopped, to the robot controller 200. Thus, upon receiving the restricting signal, the robot controller 200 can completely stop the movement of the target robot 400 whose movement is to be restricted.

As described above, upon determining that the distance L is equal to or less than the distance Lc, the monitoring device 100 controls the robot 400 differently according to the distance L between the worker 300 and the robot 400. More specifically, for example, the monitoring device 100 performs control to lower the movement speed of the robot 400 if the distance L between the worker 300 and the robot 400 is relatively great. Also, the monitoring device 100 performs control to completely stop the movement of the robot 400 if the distance L between the worker 300 and the robot 400 is short.

[Advantageous Effects of Monitoring System 1]

Next, advantageous effects of the monitoring system 1 of the present embodiment will be described. In brief, the monitoring system 1 specifies a rough position of a worker 300 and performs image processing only around the specified position. More specifically, the monitoring system 1 specifies a robot movable area 400B (see FIG. 8) and a human body area (see FIG. 9) by performing image processing according to an image of a combined area 600B in an image captured by the cameras 4. Thereafter, when the distance L between the robot movable area 400B and the human body area 300B is equal to or less than the predetermined distance Lc, the movement of the robot 400 to be controlled is restricted in the monitoring system 1. In this manner, an image for which whether or not the movement of the robot 400 is to be restricted is determined (hereinafter referred to as an "image on which image processing is to be performed") can be limited (narrowed) to the image of the combined area. Therefore, according to the monitoring system 1 of the present embodiment, it is possible to reduce the burden of image processing, compared to a known monitoring system in which such determination is made for the entire image of a work area.

In addition, the third specifying part 10 specifies the human body area 300B by processing only the ROI in the image captured by the cameras 4 and therefore it is possible to lower the processing load for specifying the human body area 300B. Since the processing load can be reduced, the monitoring system 1 can also increase the frame rate of an object for image processing. Therefore, it is possible to improve the response performance of the monitoring system 1.

Further, the monitoring system 1 according to the present embodiment detects only a robot included in the combined area 600B, that is, a robot spaced away from the worker 300 by a distance equal to or less than the distance Lc to restrict the movement of the robot. In other words, the monitoring system 1 does not restrict movement of robots other than the detected robot. Therefore, it is possible to improve the working ratio of robots within the work area α, compared to a monitoring system that restricts the movement of all robots within the work area α.

Furthermore, the combined area 600B which is an area to be subjected to image processing is obtained by excluding the exclusion area 500A from an area corresponding to the logical sum of the worker movable area 300A and the robot occupied area 400A. Therefore, compared to "the monitoring system in which image processing is performed on an area corresponding to the logical sum of the worker movable area 300A and the robot occupied area 400A from which the exclusion area 500A is not excluded", it is possible to narrow the area of an image to be subjected to image processing, thereby reducing the burden of image processing.

Moreover, the monitoring system 1 of the present embodiment measures the distance L between the robot movable area 400B narrower than the robot occupied area 400A and the human body area 300B (i.e., the aggregate 300C of cluster information). Therefore, it is possible to narrow the area of an image which is to be subjected to image processing when measuring the distance L, compared to "the monitoring system that measures the distance L between the robot occupied area 400A wider than the robot movable area 400B and the human body area 300B". Thus, it is possible to reduce the burden of image processing.

In addition, the monitoring system 1 of the present embodiment can specify the robot movable area 400B on the basis of markers (the first LED 421, the second LED 422, and the third LED 423 in the present embodiment) attached to the arms 406 of the robot 400. Therefore, the monitoring system 1 of the present embodiment can accurately specify the robot movable area 400B.

[Areas]

Figure 11:
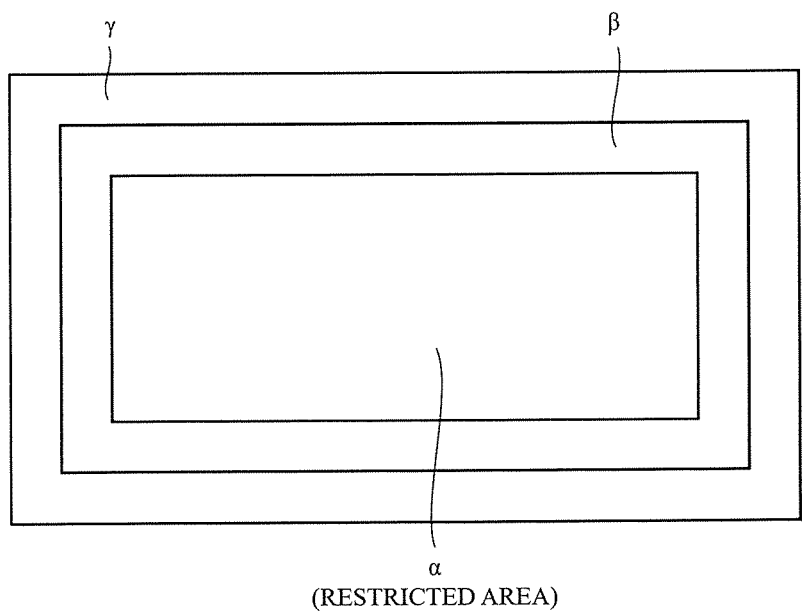
FIG. 11 is a diagram showing areas including a work area.

Next, provided areas other than the work area α will be described. FIG. 11 is a diagram showing areas including the work area α. In the example of FIG. 11, each area is viewed from directly above. In the example of FIG. 11, an intrusion detection area β is provided in an area including the entire work area α. Further, a warning area γ is provided in an area including the entire intrusion detection area β.

The warning area γ is an area where warning notification is performed by the notifying device 109 upon intrusion of an intruder irrespective of whether or not an RF tag 302 is attached to the intruder. The intrusion may be detected by the cameras 4 and may also be detected by a detection device (not shown) other than the cameras 4. The intrusion detection area β is an area where the sensors 2 can detect/authenticate an intruder or the like having an RF tag 302 attached thereto. A predetermined warning is output when a worker who has intruded into the intrusion detection area β fails to be detected/authenticated due to not having an RF tag 302 or the like. In this case, the monitoring system 1 may stop the work system (for example, stop controlling the robot 400) in view of safety.

[Flowchart]

Figure 12:
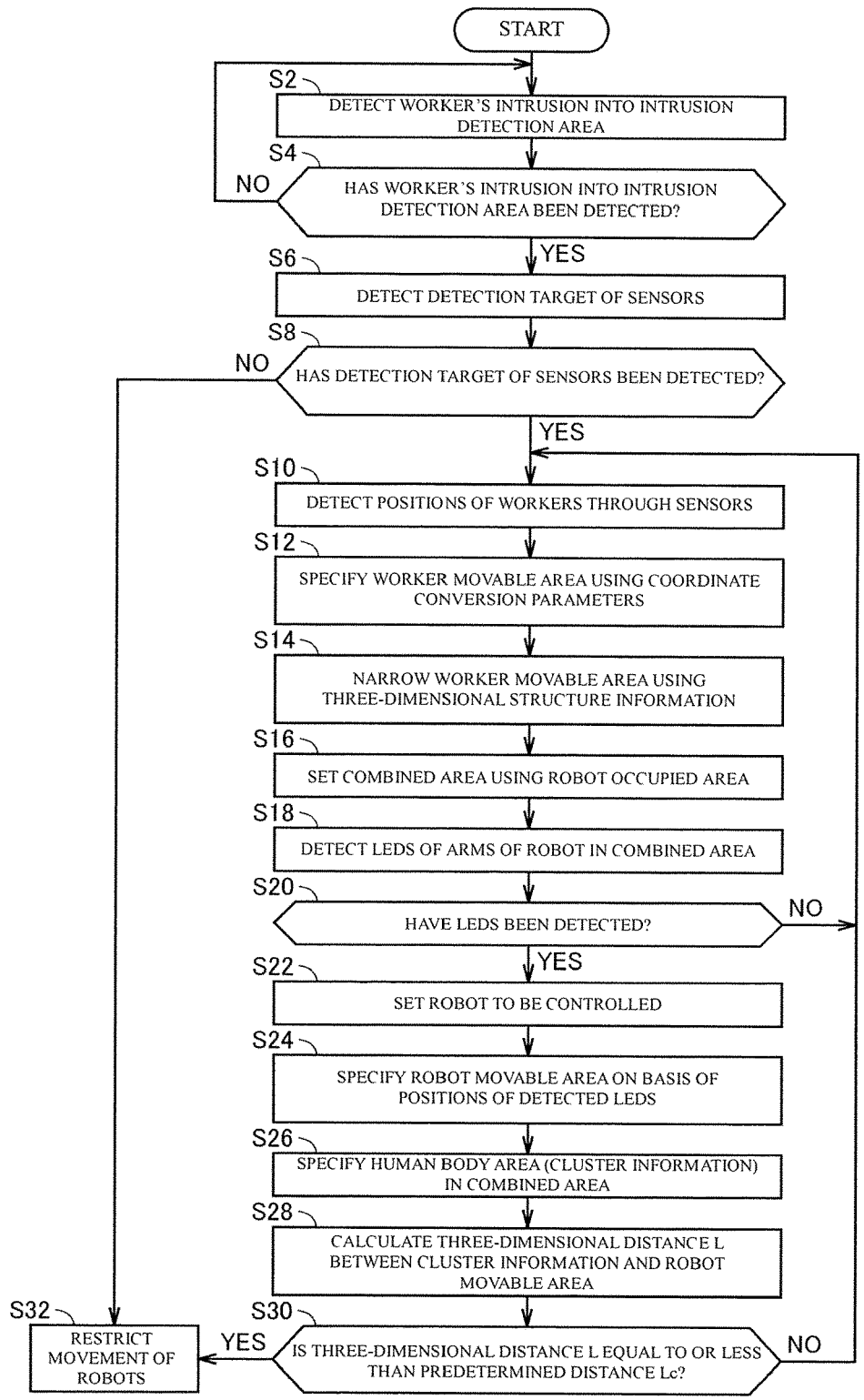
FIG. 12 is a diagram showing a flowchart for a monitoring device.

Next, a flowchart for the monitoring device 100 will be described. FIG. 12 is a diagram illustrating a flowchart for the monitoring device 100. Each step is performed by each component included in the monitoring device 100.

In step S2, the first specifying part 6 performs a detection process to detect intrusion of workers by starting detection in the intrusion detection area β through the sensors 2. In step S4, if it is determined that intrusion of a worker into the intrusion detection area β has been detected through the detection process of step S2 (YES in step S4), the process proceeds to step S6.

In step S6, the first specifying part 6 detects detection targets of the sensors 2. In step S8, the first specifying part 6 determines whether or not detection targets of the sensors 2 have been detected through the detection process of step S6. If the determination result is NO in step S8, the process proceeds to step S32. In step S32, the restricting part 14 restricts the movement of all robots 400 by transmitting a control signal to the robot controller 200. This restriction involves completely stopping the movement of all robots 400. When it is determined in step S8 that detection targets of the sensors 2 have not been detected although it is determined in step S4 that intrusion of a worker into the intrusion detection area has been detected, it is highly likely that at least one of the sensors, the monitoring device 100, and the like is faulty. Thus, in such a case, safety can be guaranteed by completely stopping the movement of all robots 400.

In step S10, the first specifying part 6 detects the position of a worker 300 through the sensors 2. Next, in step S12, the first specifying part 6 specifies (sets) a worker movable area 300A on the basis of coordinate conversion parameters which will be described later. Next, in step S14, the setting part 17 performs a process of narrowing the worker movable area 300A using three-dimensional structure information of the structure 500 according to the worker movable area 300A. The three-dimensional structure information is information including three-dimensional coordinates of the structure 500. The setting part 17 excludes the exclusion area 500A from the worker movable area 300A as the narrowing process.

Next, in step S16, the setting part 17 sets a combined area 600B using a robot occupied area 400A. Next, in step S18, the second specifying part 8 detects light emission of LEDs (a first LED 421, a second LED 422, and a third LED 423) provided in arms 406 of a robot 400 in the combined area 600B. Next, in step S20, if the second specifying part 8 determines that light emission of LEDs is detected through the detection of step S18 (YES in step S20), the second specifying part 8 determines that the robot with the detected LEDs attached thereto is a "robot to be controlled" in step S22. On the other hand, if the determination result is NO in step S20, the process returns to step S10.

In step S24, the second specifying part 8 specifies a robot movable area 400B on the basis of the positions of the detected LEDs. Next, in step S26, the third specifying part 10 specifies a human body area 300B (an aggregate 300C of cluster information) in the combined area 600B. Next, in step S28, the measuring part 12 calculates a (three-dimensional) distance L between the human body area 300B (the aggregate 300C of cluster information) and the robot movable area 400B. Next, in step S30, the restricting part 14 determines whether or not the calculated distance L is equal to or less than a predetermined distance Lc. If the determination result is YES in step S30, the movement of the robot to be controlled is restricted in step S32. On the other hand, if the determination result is NO in step S30, the process returns to step S10.

[Movement Error of Robot]

Figure 13:
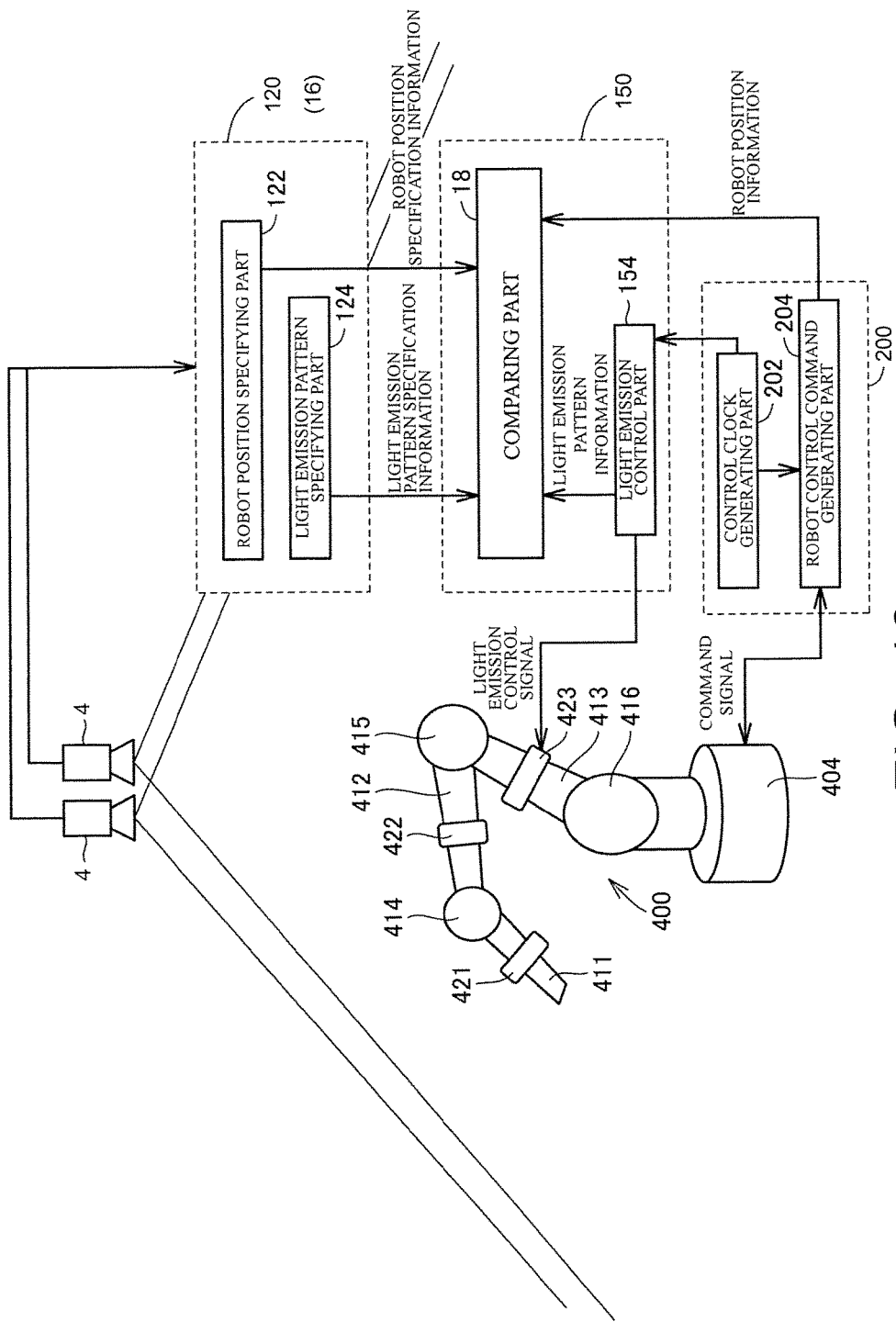
FIG. 13 is a diagram showing a method of detecting a movement error.

Next, a method of detecting a movement error of a robot will be described. FIG. 13 is a diagram illustrating the method of detecting a movement error. The method of detecting a movement error will be described with reference to FIGS. 3 and 14.

As shown in FIG. 13, the fourth specifying part 16 of the vision controller 120 includes a light emission pattern specifying part 124 and a robot position specifying part 122. The robot controller 200 includes a control clock generating part 202 and a robot control command generating part 204.

The control clock generating part 202 generates a control clock. The generated control clock is input to the robot control command generating part 204 and the light emission control part 154. The robot control command generating part 204 generates a command signal on the basis of the clock signal and transmits the command signal to the robot 400. The robot 400 moves on the basis of the command signal.

The light emission control part 154 transmits a light emission control signal to the robot 400 on the basis of the clock signal. Here, the light emission control signal is a signal indicating the light emission mode of Table 1. The first LED 421, the second LED 422, and the third LED 423 emit light on the basis of the light emission control signal. In this manner, the first LED 421, the second LED 422, and the third LED 423 are caused to emit light and the robot 400 is caused to move on the basis of the clock signal and therefore "light emission of the first LED 421, the second LED 422, and the third LED 423" and "movement of the robot 400 (the arms 406)" can be synchronized with each other.

Further, the light emission control part 154 transmits light emission pattern information shown in Table 1 to the comparing part 18. The robot control command generating part 204 transmits robot position information to the comparing part 18. The robot position information is position information of each arm (i.e., information indicating the position of each arm in the work area α) that the robot control command generating part 204 provides in a command to the robot 400.

The robot position specifying part 122 specifies (measures) the positions of the arms 406 on the basis of light emission of the first LED 421, the second LED 422, and the third LED 423 according to an image captured by the cameras 4. The robot position specifying part 122 transmits the robot position specification information to the comparing part 18. The robot position specification information is information indicating respective actual positions (respective behaviors) of the LEDs provided in each arm (information indicating each LED specified by the robot position specifying part 122).

The light emission pattern specifying part 124 specifies the light emission pattern of each LED according to the image captured by the cameras 4. Here, although the light emission pattern specifying part 124 can specify the light emission pattern, it cannot specify which of the LEDs corresponds to the specified light emission pattern. The light emission pattern specifying part 124 and the robot position specifying part 122 associates the light emission pattern specification information with a behavior of an LED that emits light in the light emission pattern specified from the light emission pattern specification information (i.e., the robot position specification information), and transmit them to the comparing part 18. "Movement information" output from the fourth specifying part in FIG. 3 includes robot position specification information and light emission pattern specification information.

The comparing part 18 compares the light emission pattern information from the light emission control part 154 with the light emission pattern specification information from the light emission pattern specifying part 124. This allows the comparing part 18 to recognize an LED corresponding to the actual light emission pattern (the light emission pattern specified by the light emission pattern specifying part 124). For example, when the actual light emission pattern is continuous light emission, the comparing part 18 recognizes that the LED continuously emitting light is the first LED 421. Similarly, the comparing part 18 recognizes the other LEDs, i.e., the second LED 422 and the third LED 423. Thereafter, the comparing part 18 compares the robot position specification information and the robot position information for each recognized LED and determines whether or not a behavior (position information) of the recognized LED matches. As an example of this determination process, the comparing part 18 calculates the difference between a numerical value of the robot position specification information and a numerical value of the robot position information. The comparing part 18 determines that there is no difference in the position information with each other if the difference is less than a threshold value and determines that there is a difference in the position information with each other if the difference is equal to or greater than the threshold value.

Upon determining that there is a difference, the comparing part 18 determines that there is an abnormality in control of the robot 400 or the like and transmits an abnormality signal indicating that there is an abnormality to the notifying device 109. The notifying device 109 performs abnormality notification on the basis of the abnormality signal. For example, when the comparing part 18 determines that the position of an arm of the robot is abnormal, the notifying device 109 displays "there is an abnormality in the arm." The movement of the robot determined to be abnormal by the comparing part 18 may be restricted. According to this configuration, abnormality notification is performed when it is determined that at least one of the arms of the robot 400 is abnormal. Therefore, it is possible to guarantee the worker's safety.

Further, the monitoring system 1 may restrict a robot for which the presence or absence of a movement error is to be detected to that included in the combined area 600B. According to this configuration, it is possible to reduce the processing for detecting the presence or absence of a movement error, compared to the configuration in which presence or absence of a movement error is detected for all robots in the work area α. In the monitoring system 1, presence or absence of a movement error may be detected for all robots in the work area α. According to this configuration, it is possible to guarantee the safety of workers 300 present in the work area α.

Note that a movement error can be similarly detected for a shiftable robot although only the case in which robots 400 are fixed has been described above.

[Coordinate Conversion Parameters]

Next, an exemplary method of calculating coordinate conversion parameters described in step S12 of FIG. 12 will be described. By calibrating a coordinate system of the sensors 2 and a coordinate system of the vision controller 120, it is possible to calculate coordinate conversion parameters. The coordinate conversion parameters are parameters that the first specifying part 6 uses to specify the worker movable area 300A according to the position of the worker 300 detected by the sensor 2.

Figure 14:
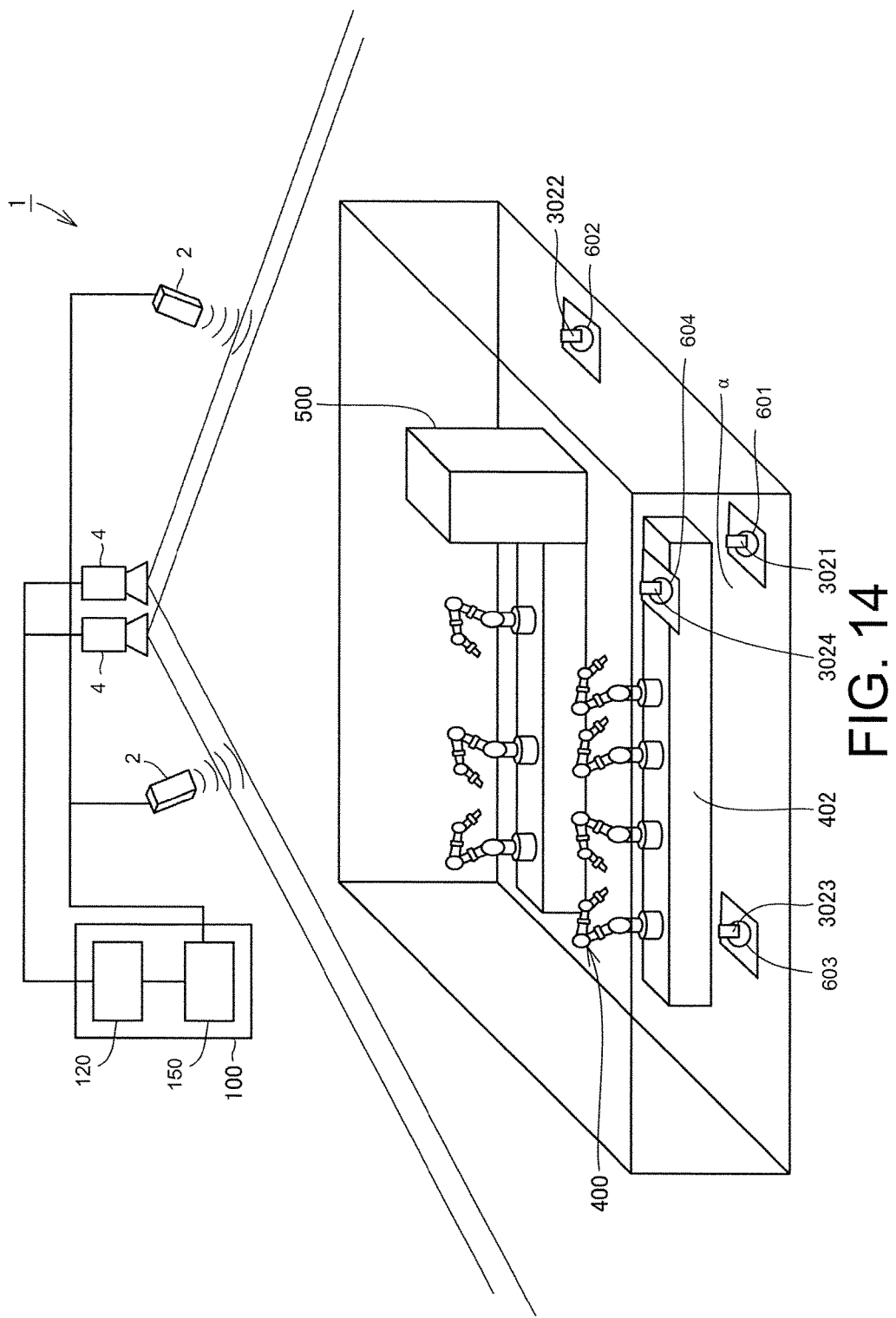
FIG. 14 is a diagram showing a method of calculating coordinate conversion parameters.

FIG. 14 is a diagram illustrating the method of calculating coordinate conversion parameters. First, a reference marker 601 for the origin and reference markers 602, 603, and 604 for other points are arranged in the work area α. Further, detection targets of the sensor 2 are arranged to overlap the reference markers 601 to 604. In the present embodiment, the detection targets are RF tags. RF tags 3021, 3022, 3023, and 3024 are arranged to overlap the reference markers 601 to 604, respectively. The number of reference markers for the other points is not limited to three and may be other numbers, for example, more than three.

The vision controller 120 extracts the reference markers 602 to 604 for the other points to construct a first reference plane H1. The first reference plane H1 is a plane including the reference markers 602 to 604. Further, the vision controller 120 extracts the reference marker 601 for the origin to specify a first coordinate origin P1 in the first reference plane H1.

Next, the safety controller 150 constructs a second reference plane H2 on the basis of detection information (three-dimensional position information) obtained from the sensors 2 that have detected the RF tags 3022 to 3024 arranged to overlap the reference markers 602, 603, and 604 for the other points, respectively. Further, the safety controller 150 specifies a second coordinate origin P2 on the basis of the detection information (three-dimensional position information) obtained from the sensors 2 that have detected the RF tag 3021 arranged to overlap the reference marker 601 for the origin. Thereafter, a monitoring part (not specifically shown) included in the monitoring device 100 calculates coordinate conversion parameters on the basis of the first reference plane H1, the first coordinate origin P1, the second reference plane H2, and the second coordinate origin P2. The calculated coordinate conversion parameters are stored in a predetermined storage area (for example, the RAM 103).

[Modification]

Although the above embodiment of the invention has been described with reference to the drawings, the invention is not limited to the above embodiment. The invention is applicable to various modifications and applications without being limited to the above embodiment. Hereinafter, modifications or the like applicable to the invention will be described.

[Captured Image]

Figure 15:
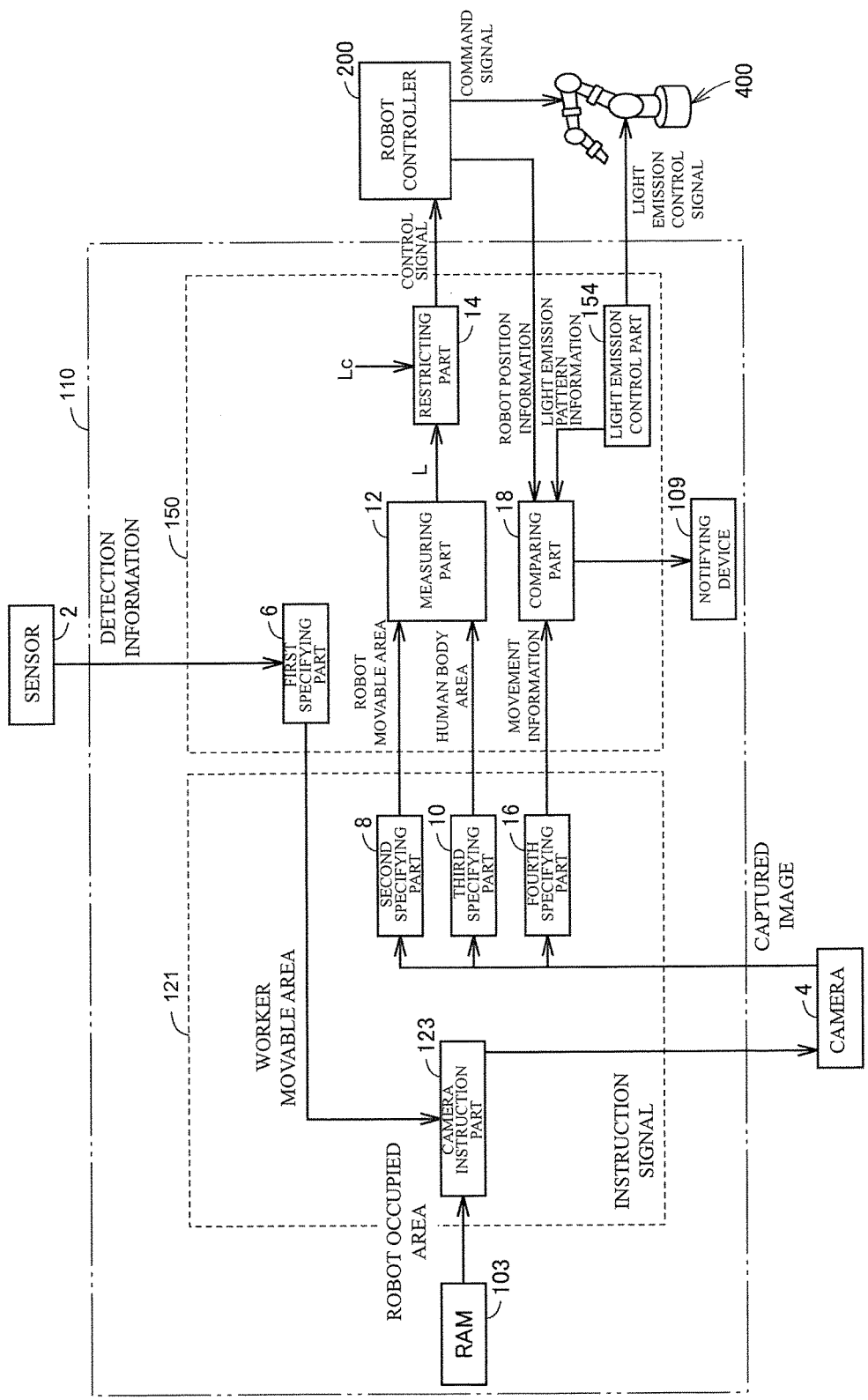
FIG. 15 is a diagram showing an exemplary functional configuration of a monitoring device according to a modification.

In the above embodiment, the cameras 4 capture all images within the work area α. In this modification, the cameras 4 capture only a part corresponding to the combined area 600B. FIG. 15 is a diagram showing an exemplary functional configuration of a monitoring device 110 of this modification. When FIG. 3 and FIG. 15 are compared, the difference is the configuration of the vision controller. A vision controller 121 of this modification (FIG. 15) is different from that of FIG. 3 in that the setting part 17 in the vision controller 120 shown in FIG. 3 is replaced by a camera instruction part 123.

The camera instruction part 123 obtains a combined area 600B from a worker movable area 300A, a robot occupied area 400A, and the like. The camera instruction part 123 transmits an instruction signal, which allows the cameras 4 to capture images of only the combined area 600B, to the cameras 4. On the basis of the instruction signal, the cameras 4 capture images of only the combined area 600B. The instruction signal is that which indicates the positions of the cameras 4, the directions of the optical axes of the lenses of the cameras, the focuses of the cameras 4, and the like. The captured images, that is, the images captured only for the combined area 600B, are input to the second specifying part 8, the third specifying part 10, and the fourth specifying part 16. The second specifying part 8 specifies a robot movable area of a robot 400 included in the combined area 600B. The third specifying part 10 specifies a human body area of a worker 300 included in the combined area 600B. The fourth specifying part 16 specifies movement information of the robot 400 included in the combined area 600B. The subsequent processes are similar to those of the above embodiment and thus the descriptions thereof will not be repeated.

According to the configuration of this modification, images of only the combined area 600B are captured, such that it is possible to reduce the number of cameras compared to the monitoring system that captures images of all regions of the work area α. Further, according to the configuration of this modification, the cameras 4 capture images when a combined area is generated, such that it is possible to reduce the burden of imaging processing compared to the monitoring system in which the cameras 4 always capture images.

[When Robot is Shiftable]

The invention can also be applied to the case in which at least one of the robots in the work area α is shiftable. This will be described below with reference to FIG. 3.

In this case, the sensors 2 detect the position of the shiftable robot. As a method of detecting the position of the shiftable robot, for example, an RF tag may be attached to the shiftable robot and the sensors 2 may detect the RF tag. The frequency of radio waves from the RF tag attached to the worker 300 may be set different from the frequency of radio waves from the RF tag attached to the shiftable robot. This allows the monitoring system to clearly specify the worker 300 and the shiftable robot without confusion.

Thereafter, the first specifying part 6 specifies both a worker movable area and a robot occupied area of the shiftable robot. The worker movable area and the robot occupied area specified by the first specifying part 6 are input to the setting part 17. The setting part 17 specifies a combined area of the worker movable area and the robot occupied area. The subsequent processes are similar to those of the above embodiment and thus the descriptions thereof will not be repeated.

According to this configuration, it is possible to guarantee safety of the worker 300 even when a shiftable robot is present in the work area α.

[RF Tags]

Figure 16:
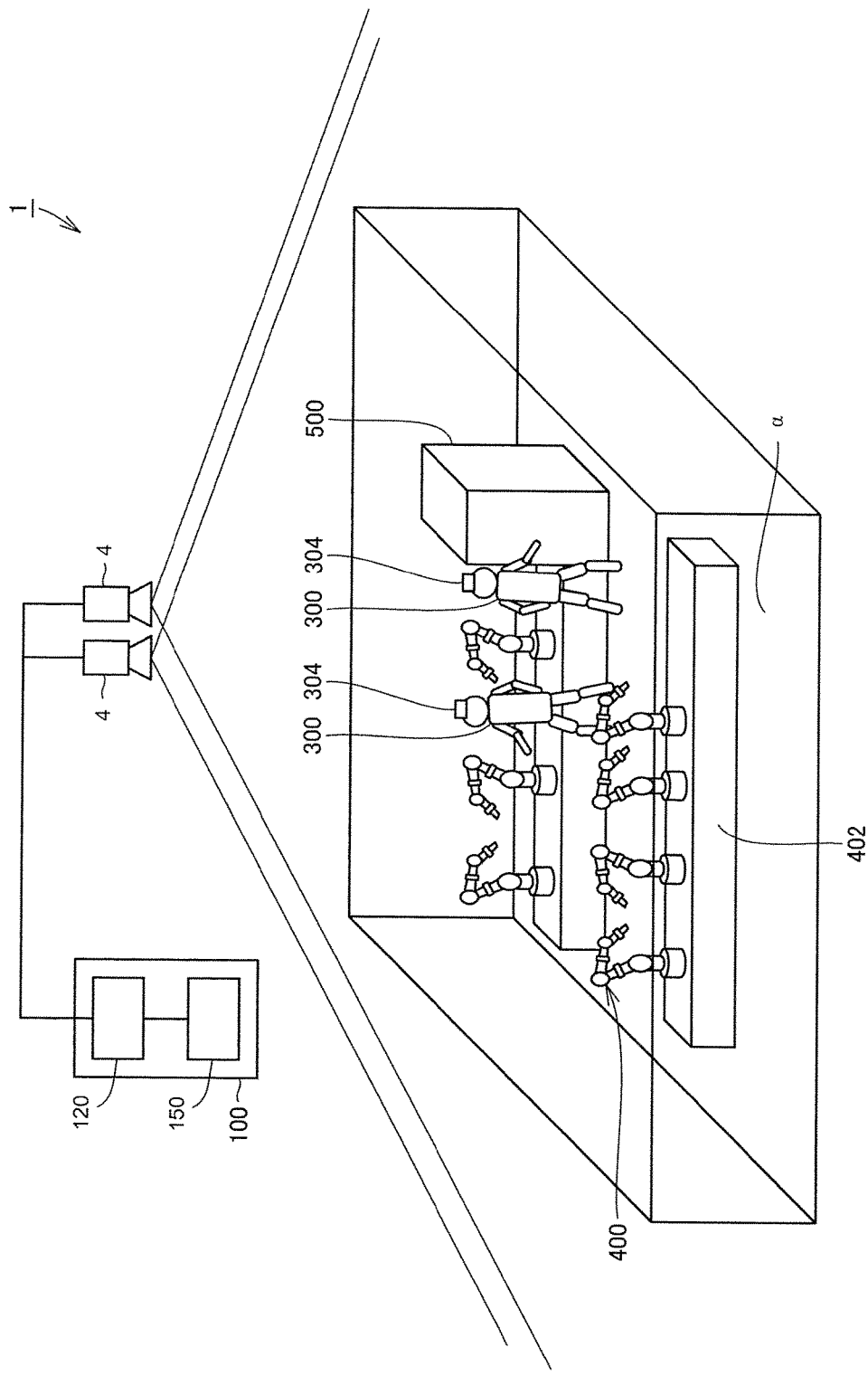
FIG. 16 is a diagram showing another method for specifying the position of a worker.

The above embodiment has been described that the RF tag 302 is attached to the worker 300 as shown in FIG. 1 to allow the sensors 2 to specify the position of the worker 300. However, other methods may be used as long as the monitoring system 1 can specify the position of the worker 300. FIG. 16 is a diagram illustrating another method for specifying the position of the worker 300. In the example of FIG. 16, an LED 304 that emits light is attached to a part of each worker. FIG. 16 shows an example in which an LED 304 is attached to a helmet worn by each worker.

The LED 304 is detected by the cameras 4 rather than by the sensors 2. Thus, the processing of the sensors 2 may be assigned to the cameras 4. According to this configuration, there is no need to provide the sensors 2 and therefore it is possible to reduce the number of parts. A light emission mode of the LED attached to the worker 300 may be set different from a light emission mode of the LED attached to the shiftable robot. This allows the monitoring system to clearly specify the worker 300 and the shiftable robot without confusion. As long as the position of the worker 300 can be specified, another method may be used without being limited to the above methods.

[LEDs Attached to Arm]

The above embodiment has been described that the LEDs are attached to the arms 406 of the robot 400 as shown in FIG. 8. However, other methods may be used as long as the monitoring system 1 can specify the positions of the arms 406. This modification will be described with reference to an example in which reflective markers are attached to the arms 406. The reflective markers are markers that reflect when illuminated.

Figure 17:
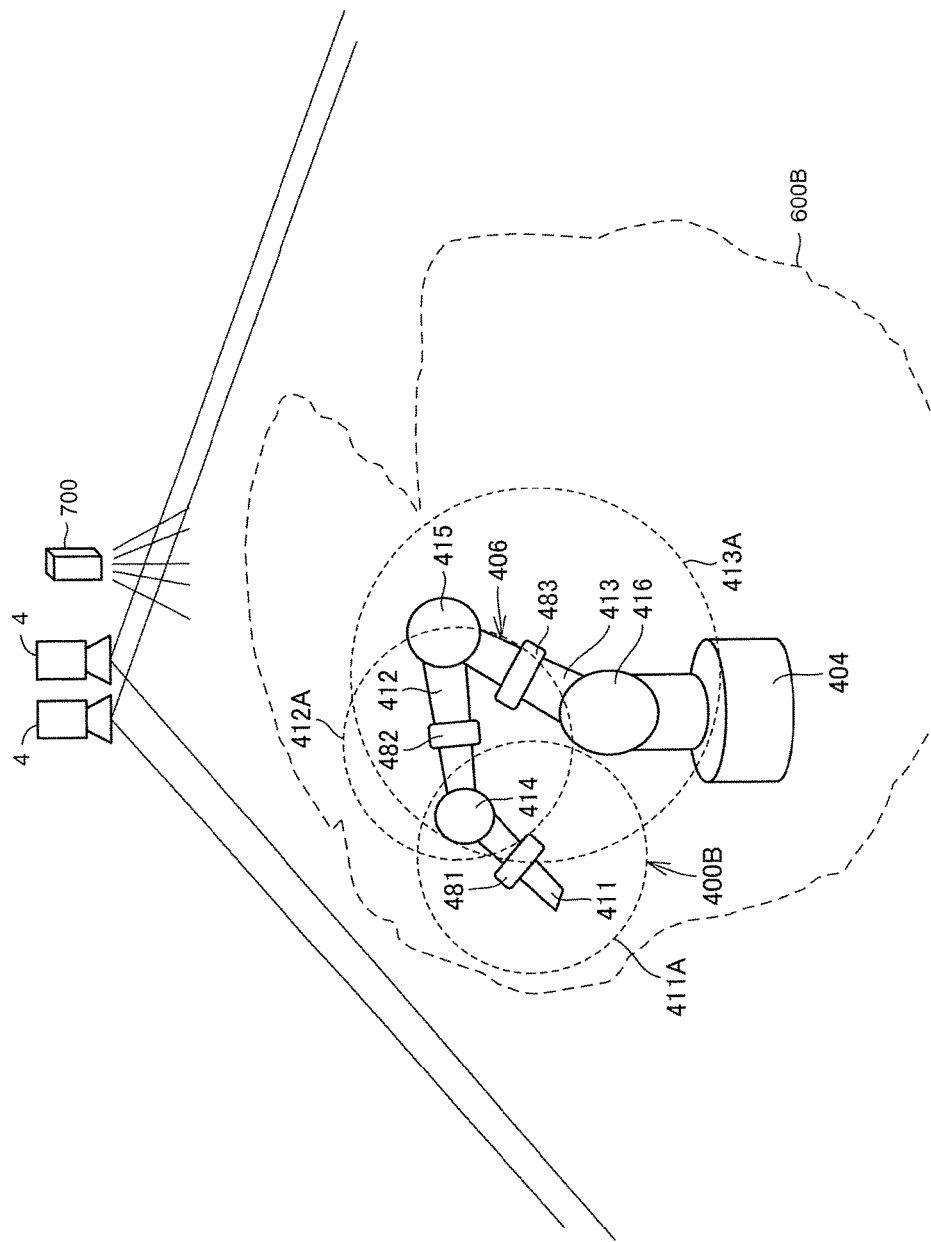
FIG. 17 is a diagram showing another method for specifying the position of an arm.

FIG. 17 is a diagram illustrating another method for specifying the positions of the arms 406. FIG. 17 shows an example in which a first reflective marker 481, a second reflective marker 482, and a third reflective marker 483 are attached to a first arm 411, a second arm 412, a third arm 413, respectively.

An external lighting 700 emits light to obtain reflected light from the reflective markers. The first reflective marker 481, the second reflective marker 482, and the third reflective marker 483 reflect light from the external lighting 700 in different patterns. For example, the first reflective marker 481 reflects a blue color, the second reflective marker 482 reflects a yellow color, and the third reflective marker 483 reflects a red color. These reflection modes (reflection colors) are stored in advance in the ROM 102.

The second specifying part 8 can recognize the movements of the first arm 411, the second arm 412, and the third arm 413 on the basis of the reflection modes stored in the ROM 102 in an image inside the combined area 600B.

The reflective markers may be configured such that reflected light of the reflective markers returns to the camera 4. The reflective markers may also be configured such that reflected light of the reflective markers scatters.

The above embodiment and this modification have been described that the light emission or reflection modes of markers attached to the first arm 411, the second arm 412, and the third arm 413 are made different in pattern. In the method for making the reflection modes different, the element in which the reflection modes are made different is not limited to pattern and the reflection modes may be made different in other elements. Another element may be, for example, frequency. Another example element may be color. These configurations also allow the second specifying part 8 to specify the respective positions of the first arm 411, the second arm 412, and the third arm 413.

Modes (for example, light emission modes) of the markers attached to the robot 400 may be different from a mode (for example, a light emission mode) of the marker attached to the worker 300. This allows the monitoring system to distinguish between the robot 400 and the worker 300, such that it is possible to guarantee safety.

[Others]

Robot monitoring systems sometimes use safety fences, safety light curtains, safety laser scanners, safety limit switches, or the like. However, since protection areas are fixed, there is a problem that it is not possible to flexibly respond to layout changes of lines in work areas or the like. On the other hand, the invention can guarantee safety of workers without using safety fences, safety light curtains, or the like, and thus can flexibly respond to layout changes.

In addition, to form a protective area three-dimensionally around each of a plurality of robots using a sensor, it is necessary to complicatedly arrange and use a plurality of sensors in three dimensions. On the other hand, the invention can guarantee safety of workers without providing sensors respectively for the plurality of robots, and thus can simplify the arrangement of sensors.

The processes of the monitoring device 100 are realized by each hardware component and software executed by the CPU 101. Such software may be stored in advance in the flash memory 104. The software may sometimes be stored in a memory card or other recording medium and distributed as a program product. The software may also be provided as a downloadable program product by an information provider connected to the Internet. The software is read from the recording medium by an IC card reader/writer or other reading device or is downloaded via the communication IF and then temporarily stored in the flash memory 104. The software is read out from the flash memory 104 by the CPU 101 and is further stored in an executable program format in the flash memory 104. The CPU 101 executes the program.

The components of the monitoring device 100 shown in FIG. 2 are general ones. Thus, it can be said that, in one or some of exemplary embodiments of the invention, the essential part is software stored in the flash memory 104, a memory card or other recording medium, or software that can be downloaded via a network.

The recording medium is not limited to a DVD-ROM, a CD-ROM, a flexible disk (FD), and a hard disk, and may include a medium that stores a program in a static manner such as a magnetic tape, a cassette tape, an optical disk (for example, a magnetic optical disc (MO), a mini disc (MD), or a digital versatile disc (DVD)), an optical card, a semiconductor memory such as a mask ROM, an electronically programmable read-only memory (EPROM), an electronically erasable programmable read-only memory (EEPROM), or a flash ROM. The recording medium is a non-transitory medium from which the computer can read the program or the like.

The program referred to herein includes not only a program that is directly executable by the CPU but also a program in a source program format, a compressed program, an encrypted program, or the like.

The embodiments disclosed herein should be considered to be illustrative in all respects and not restrictive. The scope of the invention is indicated by the appended claims rather than by the foregoing description, and the invention is intended to include all modifications within the concept and scope equivalent to the claims.

What is claimed is:

1. A monitoring system configured to monitor movement of a worker and a robot to allow the worker to work safely in a work area in which the worker and the robot work, the monitoring system comprising:
a sensor configured to detect a position of the worker that has intruded into the work area;
a first controller configured to specify a worker movable area indicating a range in which the worker is movable on the basis of the position of the worker detected by the sensor;
a camera configured to capture an image of an area including at least the worker movable area specified by the first controller and a predetermined robot occupied area of the robot; and
a second controller configured to specify a robot movable area indicating a range in which a movable portion of the robot is movable according to the image of the area captured by the camera, and further configured to specify a human body area of the worker according to the image of the area captured by the camera,
wherein the second controller is further configured to set an area obtained by excluding an area in which the worker cannot be present from an area that is a combination of the worker movable area and the robot occupied area that at least partially overlaps the worker movable area as a combined area,
wherein the camera is configured to capture the image of only the combined area,
wherein the first controller is further configured to measure a distance between the robot movable area specified by the second controller and the human body area specified by the second controller,
wherein the first controller is further configured to restrict movement of the robot when the distance measured by the first controller is equal to or less than a predetermined distance.

2. The monitoring system according to claim 1, wherein the second controller is configured to specify the robot movable area according to an image of the combined area in the area captured by the camera, and the second controller-is configured to specify the human body area according to the image of the combined area in the area captured by the camera.

3. The monitoring system according to claim 1, wherein the second controller is configured to specify the robot movable area on the basis of a marker provided on the movable portion of the robot.

4. The monitoring system according to claim 1, wherein the second controller is further configured to specify a position of the movable portion of the robot according to an image captured by the camera on the basis of a marker provided on the movable portion of the robot, and
wherein the first controller is further configured to compare the position of the movable portion of the robot specified by the second controller with a movement indicated by movement information input to a controller of the robot.

5. The monitoring system according to claim 1, wherein the robot is shiftable,
the sensor is further configured to specify a position of the robot, and
the first controller is further configured to specify the robot occupied area on the basis of the position of the robot detected by the sensor.

6. A monitor configured to monitor movement of a worker and a robot to allow the worker to work safely in a work area in which the worker and the robot work, the monitor comprising:
a first controller configured to specify a worker movable area indicating a range in which the worker is movable on the basis of a position of the worker detected by a sensor configured to detect the position of the worker that has intruded into the work area; and
a second controller configured to specify a robot movable area indicating a range in which a movable portion of the robot is movable according to an image of an area captured by a camera configured to capture the image of the area including at least the worker movable area specified by the first controller and a predetermined robot occupied area of the robot,
wherein the second controller is further configured to specify a human body area of the worker according to the image of the area captured by the camera,
wherein the second controller is further configured to set an area obtained by excluding an area in which the worker cannot be present from an area that is a combination of the worker movable area and the robot occupied area that at least partially overlaps the worker movable area as a combined area,
wherein the camera is configured to capture the image of only the combined area,
wherein the first controller is further configured to measure a distance between the robot movable area specified by the second controller and the human body area specified by the second controller; and the first controller is further configured to restrict movement of the robot when the distance measured by the first controller is equal to or less than a predetermined value.

7. A monitoring method for monitoring movement of a worker and a robot to allow the worker to work safely in a work area in which the worker and the robot work, the monitoring method comprising:
- specifying a worker movable area indicating a range in which the worker is movable on the basis of a position of the worker detected by a sensor configured to detect the position of the worker that has intruded into the work area;
- setting an area obtained by excluding an area in which the worker cannot be present from an area that is a combination of the worker movable area and a predetermined robot occupied area of the robot that at least partially overlaps the worker movable area as a combined area;
- capturing an image of only the combined area;
- specifying a robot movable area indicating a range in which a movable portion of the robot is movable according to the captured image of only the combined area;
- specifying a human body area of the worker according to the image of the area captured by the camera;
- measuring a distance between the robot movable area and the human body area; and
- restricting movement of the robot when the measured distance is equal to or less than a predetermined value.

* * * * *